United States Patent
Vanam et al.

(10) Patent No.: US 10,750,172 B2
(45) Date of Patent: Aug. 18, 2020

(54) PREDICTION SYSTEMS AND METHODS FOR VIDEO CODING BASED ON FILTERING NEAREST NEIGHBORING PIXELS

(71) Applicant: Vid Scale, Inc., Wilmington, DE (US)

(72) Inventors: Rahul Vanam, San Diego, CA (US); Yuwen He, San Diego, CA (US); Yan Ye, San Diego, CA (US)

(73) Assignee: Vid Scale, Inc., Wilmington, DE (US)

( * ) Notice: Subject to any disclaimer, the term of this patent is extended or adjusted under 35 U.S.C. 154(b) by 0 days.

(21) Appl. No.: 16/093,103

(22) PCT Filed: Apr. 21, 2017

(86) PCT No.: PCT/US2017/028822
§ 371 (c)(1),
(2) Date: Oct. 11, 2018

(87) PCT Pub. No.: WO2017/184970
PCT Pub. Date: Oct. 26, 2017

(65) Prior Publication Data
US 2019/0182482 A1    Jun. 13, 2019

Related U.S. Application Data

(60) Provisional application No. 62/326,590, filed on Apr. 22, 2016.

(51) Int. Cl.
H04N 19/117    (2014.01)
H04N 19/182    (2014.01)
(Continued)

(52) U.S. Cl.
CPC ......... *H04N 19/117* (2014.11); *H04N 19/105* (2014.11); *H04N 19/132* (2014.11);
(Continued)

(58) Field of Classification Search
None
See application file for complete search history.

(56) References Cited

U.S. PATENT DOCUMENTS

2012/0082242 A1*   4/2012  Narroschke .......... H04N 19/423
                                                    375/240.25
2014/0355695 A1*  12/2014  Lim ...................... H04N 19/82
                                                    375/240.29

OTHER PUBLICATIONS

Kazubek, "Wavelet Domain Image Denoising by Thresholding and Wiener Filtering," IEEE Signal Processing Letters, vol. 10, No. 11, Nov. 2003, pp. 324-326 (Year: 2003).*
(Continued)

*Primary Examiner* — Christopher Braniff
(74) *Attorney, Agent, or Firm* — Invention Mine LLC

(57) ABSTRACT

Prediction systems and methods for video coding are described based on nearest neighboring pixels. In exemplary embodiments, to code a first pixel, a plurality of neighboring pixels of the first pixel are reconstructed. The coefficients of a filter such as a Wiener filter are derived based on the reconstructed neighboring pixels. The Wiener filter is applied to the reconstructed neighboring pixels to predict the first pixel. The coefficients of the Wiener filter may be derived on a pixel-by-pixel or a block-by-block basis. The reconstructed pixels may be pixels in the same picture (for intra prediction) or in a reference picture (for inter prediction). In some embodiments, the residuals of the prediction are encoded using RDPCM. In some embodiments, the residuals may be predicted using a Wiener filter.

20 Claims, 24 Drawing Sheets

(51) Int. Cl.
H04N 19/154 (2014.01)
H04N 19/105 (2014.01)
H04N 19/132 (2014.01)
H04N 19/159 (2014.01)
H04N 19/176 (2014.01)
H04N 19/82 (2014.01)
H04N 19/593 (2014.01)

(52) U.S. Cl.
CPC ......... *H04N 19/154* (2014.11); *H04N 19/159* (2014.11); *H04N 19/176* (2014.11); *H04N 19/182* (2014.11); *H04N 19/82* (2014.11); *H04N 19/593* (2014.11)

(56) References Cited

OTHER PUBLICATIONS

Notification of Transmittal of the International Search Report and the Written Opinion of the International Searching Authority, or the Declaration for PCT/US2017/028822 dated Jun. 27, 2017, 15 pages.
Limin Liu et al: "Enhanced Intra Prediction Using Context-Adaptive Linear Prediction", 26. Picture Coding Symposium; Nov. 7, 2007-Nov. 9, 2007; Lisbon, Nov. 7, 2007 (Nov. 7, 2007), XP030080404, abstract; figure 3 Section 1-4, 4 pages.
Hua Ye et al: "A weighted least squares method for adaptive prediction in lossless image compression", 23. Picture Coding Symposium; Apr. 23, 2003-Apr. 25, 2003; Saint Malo, Apr. 23, 2003 (Apr. 23, 2003), XP030080091, the whole document, 5 pages.
Garcia D C et al: "Least-Squares Directional Intra Prediction in H.264/AVC", IEEE Signal Processing Letters, IEEE Service Center, Piscataway, NJ, US, vol. 17, No. 10, Oct. 1, 2010 (Oct. 1, 2010). pp. 831-834, XP011313846, ISSN: 1070-9908, abstract; figures 1-3, 4 pages.
Jani Lainema et al: "Intra Coding of the HEVC Standard", IEEE Transactions on Circuits and Systems for Video Technology, IEEE Service Center, Piscataway, NJ, US, vol. 22, No. 12, Dec. 1, 2012 (Dec. 1, 2012), pp. 1792-1801, XP011487148, ISSN: 1051-8215, 10 pages.
Yung-Lyu et al: "Improved lossless intra coding for H.264/MPEG-4 AVC", IEEE Transactions on Image Processing, vol. 15, No. 9, Sep. 1, 2006 (Sep. 1, 2006), pp. 2610-2615, XP055010349, ISSN: 1057-7149, DOI: 10.1109/TIP.2006.877396, abstract, 6 pages.
Written Opinion of the International Preliminary Examining Authority for PCT/US2017/028822 dated Mar. 22, 2018.
International Preliminary Report on Patentability for PCT/US2017/028822 dated Jul. 6, 2018.
ITU-T Rec H.263, "Video coding for low bit rate communication", (2005).
Boyce, J., et. al., "Draft high efficiency video coding (HEVC) version 2, combined format range extensions (RExt), scalability (SHVC), and multi-view (MV-HEVC) extensions", Document no JCTVC-R1013. Jul. 2014.
Lainema, J., et. al., "Intra Coding of the HEVC Standard," IEEE Transactions on CSVT, vol. 22, No. 12, Dec. 2012.
Mccann, K., et. al., "High Efficiency Video Coding (HEVC) Test Model 16 (HM 16) Improved Encoder Description", JCTVC-S1002, Oct. 2014.
Chen, J., el al., "Chroma intra prediction by reconstructed luma samples", JCTVC-C206, Oct. 2010.
Tsai, C-Y, et. al. "Adaptive loop filtering for video coding," IEEE Journal of Selected Topics in Signal Processing, vol. 1, No. 6, pp. 934-945, Dec. 2013.
International Telecommunication Union, "Codec for Audiovisual Services at nx384kbit/s". Series H: Audiovisual and Multimedia Systems, Coding of moving video, H.261, Nov. 1988, 14 pages.
International Standard, "Information Technology—Generic Coding of Moving Pictures and Associated Audio Information: Systems". ISO/IEC 13818-1, second edition, Dec. 1, 2000, 174 pages.
International Telecommunication Union, "Advanced Video Coding for Generic Audiovisual Services". In Series H: Audiovisual and Multimedia Systems; Infrastructure of audiovisual services; Coding of moving video. ITU-T Rec H.264 (Nov. 2007), 564 pages, Nov. 2007.
Haykin, S., "Adaptive Filter Theory". 5th Edition, Prentice Hall, (2013), pp. 102-105.
Alshina E., et. al., "Known Tools Performance Investigation for Next Generation Video Coding". ITU-Telecommunications Standardization Sector, Samsung Electronics, Video Coding Experts Group (VCEG), VCEG-AZ05, Jun. 19-26, 2015, 5 pages.
Chen, J., et. al., "Further Improvements to HMKTA-1.0". ITU-Telecommunications Standardization Sector, Qualcomm Incorporated, Video Coding Experts Group (VCEG), VCEG-AZ07, Jun. 19-26, 2015, VCEG-AZ07, 8 pages.
Salmela, P., et. al., "Several Approaches to Fixed-Point Implementation of Matrix Inversion". IEEE International Symposium on Signals, Circuits and Systems (ISSCS), vol. 2, (2005), pp. 497-500.
Wikipedia, "Wiener Filter". Wikipedia web article available at: https://en.wikipedia.org/w/index.php?title=Wiener_filter&oldid=730051337 , modified on Jul. 16, 2016, 7 pages.

* cited by examiner

PART_2Nx2N    PART_NxN

Current Pixel $x_i$ under consideration

Reconstructed pixel

Reconstructed pixel used for training

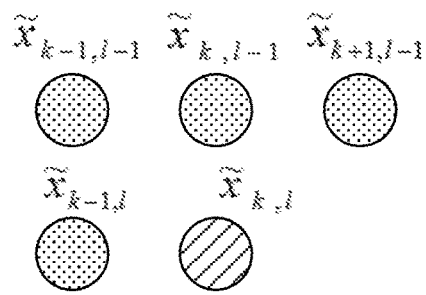
FIG. 14A
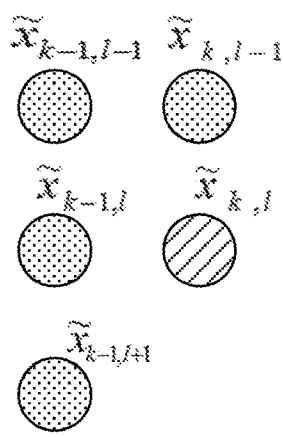
FIG. 14B
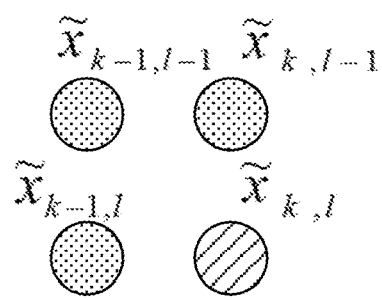
FIG. 14C
 Neighboring reconstructed pixel
 Training pixel

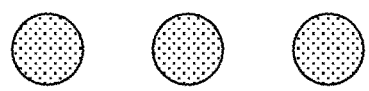
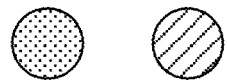
FIG. 15A
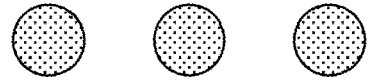
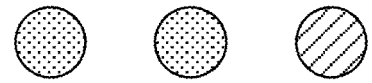
FIG. 15B
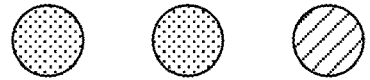
FIG. 15C
 Neighboring reconstructed pixel
 Training pixel

PREDICTION SYSTEMS AND METHODS FOR VIDEO CODING BASED ON FILTERING NEAREST NEIGHBORING PIXELS

CROSS-REFERENCE TO RELATED APPLICATIONS

The present application is a national stage application under 35 U.S.C. 371 of International Application No. PCT/US2017/028822, entitled PREDICTION SYSTEMS AND METHODS BASED ON NEAREST NEIGHBORING PIXELS FOR VIDEO CODING, filed on Apr. 21, 2017, which claims benefit under 35 U.S.C. § 119(e) from U.S. Provisional Patent Application Ser. No. 62/326,590, filed Apr. 22, 2016, entitled "Prediction Systems and Methods Based on Nearest Neighboring Pixels for Video Coding," which is incorporated herein by reference in its entirety.

BACKGROUND

Video coding systems are widely used to compress digital video signals to reduce the storage need and/or transmission bandwidth of such signals. Among the various types of video coding systems, such as block-based, wavelet-based, and object-based systems, nowadays block-based hybrid video coding systems are the most widely used and deployed. Examples of block-based video coding systems include international video coding standards such as H.261, MPEG-1, MPEG-2, H.263, H.264/AVC, and H.265/HEVC.

SUMMARY

Exemplary systems and methods described herein provide for encoding and decoding (collectively "coding") of video in a bitstream using filter-based prediction. In an exemplary method of coding a video in a bitstream, the video includes a plurality of frames, each frame comprising blocks of pixels. A plurality of pixels neighboring a current block are reconstructed. For each of the pixels in the current block: (i) a respective set of reconstructed pixels neighboring the current pixel is used to derive a corresponding set of filter coefficients; and (ii) the current pixel is predicted by applying a filter to a respective pattern of reconstructed pixels neighboring the current pixel, wherein the filter uses the corresponding set of derived filter coefficients. The filter may be a Wiener filter. Prediction of a pixel results in a pixel value that, in an encoding method, can be subtracted from an original pixel input value to determine a residual that is encoded in the bitstream. In a decoding method, a residual can be decoded from the bitstream and added to the predicted pixel value to obtain a reconstructed pixel that is identical to or approximates the original input pixel. Prediction methods as described herein thus improve the operation of video encoders and decoders by decreasing, in at least some implementations, the number of bits required to encode and decode video. Further benefits of exemplary prediction methods to the operation of video encoders and decoders are described in the Detailed Description.

In some embodiments, the derivation of filter coefficients is performed recursively, such that a pixel predicted using one set of filter coefficients may in turn be used in deriving a new set of filter coefficients to predict a further pixel. For example, in some embodiments, for at least one of the pixels in the current block, the respective set of neighboring pixels used to derive the corresponding set of filter coefficients includes at least one other pixel in the current block. In some embodiments at least a first pixel in the current block is reconstructed by adding a residual to the prediction of the first pixel to generate a first reconstructed pixel. The first reconstructed pixel may then be included in the set of reconstructed pixels used to derive the filter coefficients used to predict at least a second pixel in the current block. In some embodiments, for each of the pixels in the current block, the pattern of reconstructed pixels is a subset of the set of reconstructed pixels.

In some exemplary embodiments, to code a first pixel in a video, a plurality of neighboring pixels of the first pixel are reconstructed. Coefficients of a Wiener filter or other filter are then derived based on the reconstructed neighboring pixels, and the first pixel is predicted by applying the Wiener filter to at least some of the reconstructed neighboring pixels. The coefficients may be derived on a pixel-by-pixel basis or a block-by-block basis.

In some embodiments, filter-based prediction techniques as described herein are used to predict residuals. In some embodiments, the filter-based prediction techniques are combined with other prediction techniques (e.g. other intra and inter prediction techniques). For example, a composite prediction of a current block may be generated as a weighted sum of filter-based prediction of the block and an inter or intra prediction of the block.

In some embodiments, filter coefficients are signaled in the bitstream.

In some embodiments, filter-based prediction techniques are used to predict residuals that remain from prediction using other techniques, such as residuals from intra or inter prediction. One such method is provided for coding a video in a bitstream, where the video comprises a plurality of frames, each frame comprising blocks of pixels. In the exemplary method, a plurality of pixels neighboring a current block are reconstructed and residuals are determined for those neighboring reconstructed pixels. The residuals of neighboring reconstructed pixels are used to derive coefficients of a filter, and residuals of pixels in the current block are predicted by applying the filter to a respective pattern of residuals of reconstructed pixels neighboring the current pixel, where the filter uses the corresponding set of derived filter coefficients. In some embodiments, a first-order prediction of the current block is generated using intra or inter prediction, and a second-order prediction of the current block is generated by adding the predicted residuals for the current block to the first-order prediction. Second-order residuals representing the difference between the second-order prediction and the input or reconstruction signal may be signaled in the bitstream. In some embodiments, coefficients used to predict the residuals are derived on a block-by-block basis. In some embodiments, those coefficients are derived on a pixel-by-pixel basis.

Exemplary video encoders and decoders that implement the filter-based prediction are described. The present disclosure further describes bitstreams generated using the encoding techniques disclosed herein.

BRIEF DESCRIPTION OF THE DRAWINGS

A more detailed understanding may be had from the following description, presented by way of example in conjunction with the accompanying drawings, which are first briefly described below.

FIGS. 14A-14C are diagrams illustrating exemplary Wiener filter patterns. These pattern are also associated with neighboring reconstructed pixels chosen for a given training pixel. Filter patterns are illustrated for horizontal scan order (HSO) (FIG. 14A), vertical scan order (VSO) (FIG. 14B), and boundary pixels (right boundary for HSO and bottom boundary for VSO) (FIG. 14C).

FIGS. 15A-15C are diagrams illustrating additional exemplary Wiener filter patterns.

DETAILED DESCRIPTION

A detailed description of illustrative embodiments will now be provided with reference to the various figures. Although this description provides detailed examples of possible implementations, it should be noted that the provided details are intended to be by way of example and in no way limit the scope of the application.

Block-Based Video Encoder.

Figure 1:
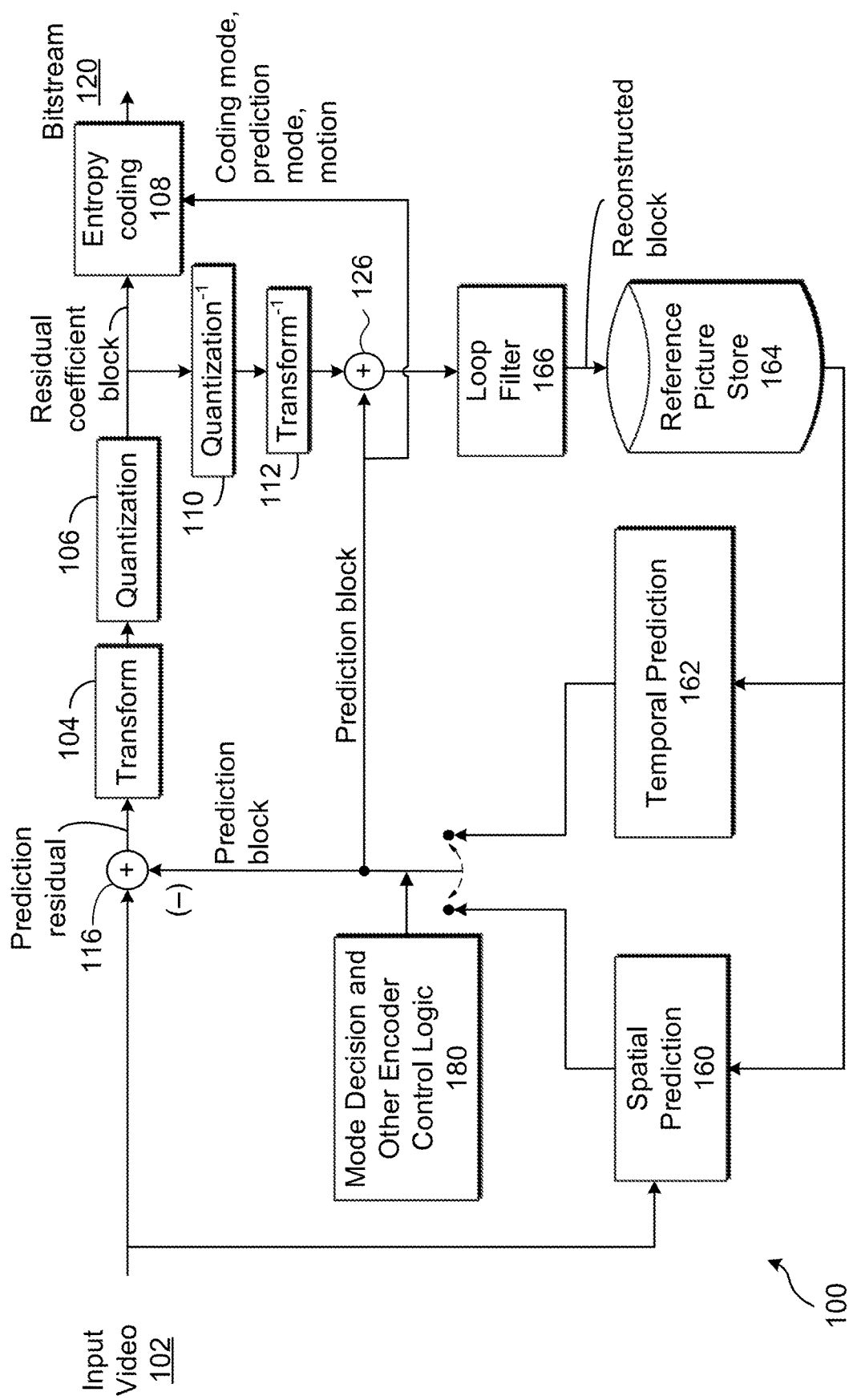
FIG. 1 is a functional block diagram illustrating an example of a block-based video encoder.

FIG. 1 is a block diagram illustrating an example of a block-based video encoder, for example, a hybrid video encoding system. The video encoder 100 may receive an input video signal 102. The input video signal 102 may be processed block by block. A video block may be of any size. For example, the video block unit may include 16×16 pixels. A video block unit of 16×16 pixels may be referred to as a macroblock (MB). In High Efficiency Video Coding (HEVC), extended block sizes (e.g., which may be referred to as a coding tree unit (CTU) or a coding unit (CU), two terms which are equivalent for purposes of this disclosure) may be used to efficiently compress high-resolution (e.g., 1080p and beyond) video signals. In HEVC, a CU may be up to 64×64 pixels. A CU may be partitioned into prediction units (PUs), for which separate prediction methods may be applied.

For an input video block (e.g., an MB or a CU), spatial prediction 160 and/or temporal prediction 162 may be performed. Spatial prediction (e.g., "intra prediction") may use pixels from already coded neighboring blocks in the same video picture/slice to predict the current video block. Spatial prediction may reduce spatial redundancy inherent in the video signal. Temporal prediction (e.g., "inter prediction" or "motion compensated prediction") may use pixels from already coded video pictures (e.g., which may be referred to as "reference pictures") to predict the current video block. Temporal prediction may reduce temporal redundancy inherent in the video signal. A temporal prediction signal for a video block may be signaled by one or more motion vectors, which may indicate the amount and/or the direction of motion between the current block and its prediction block in the reference picture. If multiple reference pictures are supported (e.g., as may be the case for H.264/AVC and/or HEVC), then for a video block, its reference picture index may be sent. The reference picture index may be used to identify from which reference picture in a reference picture store 164 the temporal prediction signal comes.

The mode decision block 180 in the encoder may select a prediction mode, for example, after spatial and/or temporal prediction. The prediction block may be subtracted from the current video block at 116. The prediction residual may be transformed 104 and/or quantized 106. The quantized residual coefficients may be inverse quantized 110 and/or inverse transformed 112 to form the reconstructed residual, which may be added back to the prediction block 126 to form the reconstructed video block.

In-loop filtering (e.g., a deblocking filter, a sample adaptive offset, an adaptive loop filter, and/or the like) may be applied 166 to the reconstructed video block before it is put in the reference picture store 164 and/or used to code future video blocks. The video encoder 100 may output an output video stream 120. To form the output video bitstream 120, a coding mode (e.g., inter prediction mode or intra prediction mode), prediction mode information, motion information, and/or quantized residual coefficients may be sent to the entropy coding unit 108 to be compressed and/or packed to form the bitstream. The reference picture store 164 may be referred to as a decoded picture buffer (DPB).

Block-Based Video Decoder.

Figure 2:
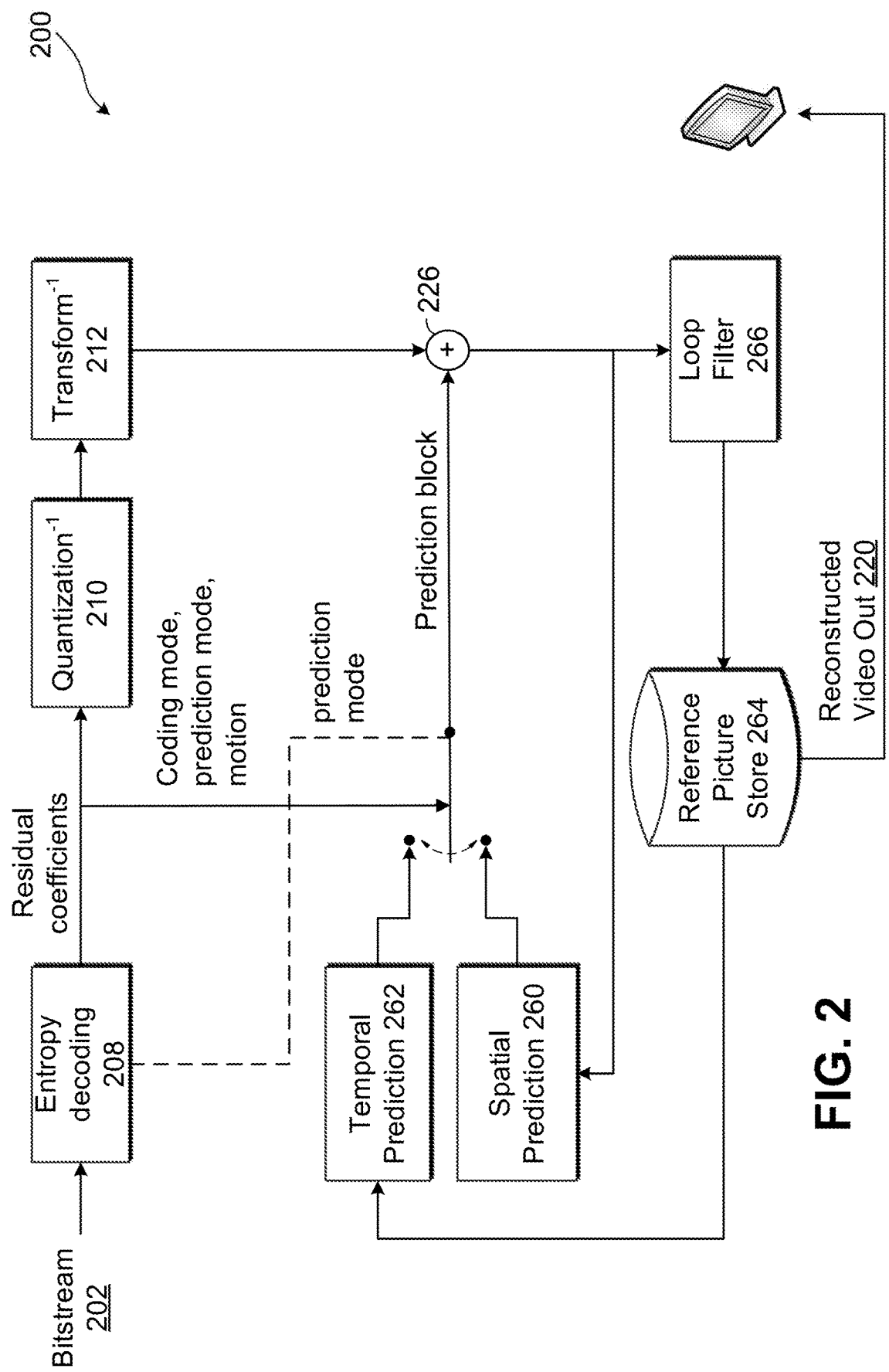
FIG. 2 is a functional block diagram illustrating an example of a block-based video decoder.

FIG. 2 is a block diagram illustrating an example of a block-based video decoder. The video decoder 200 may receive a video bitstream 202. The video bitstream 202 may be unpacked and/or entropy decoded at entropy decoding unit 208. The coding mode and/or prediction information used to encode the video bitstream may be sent to the spatial prediction unit 260 (e.g., if intra coded) and/or the temporal prediction unit 262 (e.g., if inter coded) to form a prediction block. If inter coded, the prediction information may comprise prediction block sizes, one or more motion vectors (e.g., which may indicate direction and amount of motion), and/or one or more reference indices (e.g., which may indicate from which reference picture to obtain the prediction signal). Motion-compensated prediction may be applied by temporal prediction unit 262 to form a temporal prediction block.

The residual transform coefficients may be sent to an inverse quantization unit 210 and an inverse transform unit 212 to reconstruct the residual block. The prediction block and the residual block may be added together at 226. The reconstructed block may go through in-loop filtering 266 before it is stored in reference picture store 264. The reconstructed video in the reference picture store 264 may be used to drive a display device and/or used to predict future video blocks. The video decoder 200 may output a reconstructed video signal 220. The reference picture store 264 may also be referred to as a decoded picture buffer (DPB).

A video encoder and/or decoder (e.g., video encoder 100 or video decoder 200) may perform spatial prediction (e.g., which may be referred to as intra prediction). Spatial prediction may be performed by predicting from already coded neighboring pixels following one of a plurality of prediction directions (e.g., which may be referred to as directional intra prediction).

Intra Coding.

Figures 3, 4:
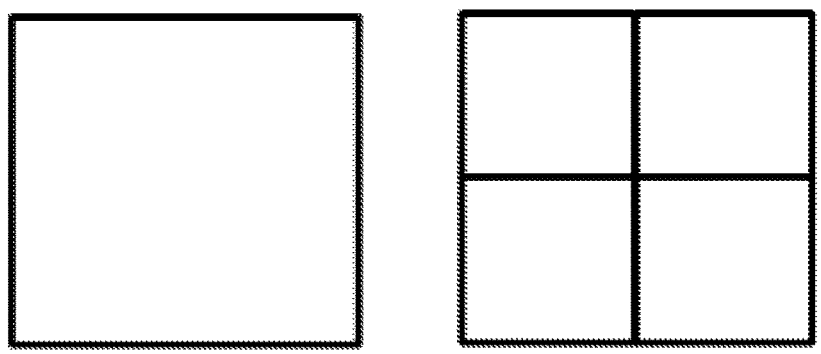
FIG. 3 is a diagram illustrating the notation used in the present disclosure to describe reference samples and predicted samples in intra prediction.
FIG. 4 is a diagram illustrating PART_2N×2N and PART_N×N partitions used for prediction unit (PU) division.

Intra coding is used to reduce the spatial correlation in most image and video coding standards such as JPEG, H.261, MPEG-1, MPEG-2, H.263, H.264/AVC and H.265/HEVC. Directional intra prediction has been used in H.264/AVC and H.265/HEVC to improve the coding efficiency. The intra prediction modes utilize a set of reference samples from immediate above row and left column of the current block to be predicted. In the following sections, the reference samples are denoted by $R_{x,\,y}$ with (x, y) having its origin one pixel above and one pixel on the left relative to the block's top-left corner. Similarly, $P_{x,y}$ is used to denote a predicted sample value at a position (x, y). FIG. 3 illustrates notation used herein for reference samples and predicted samples.

Spatial prediction may be performed on a video block of various sizes and/or shapes. Spatial prediction of a luma component of a video signal may be performed, for example, for block sizes of 4×4, 8×8, and 16×16 pixels (e.g., in H.264/AVC). Spatial prediction of a chroma component of a video signal may be performed, for example, for block size of 8×8 (e.g., in H.264/AVC). For a luma block of size 4×4 or 8×8, a total of nine prediction modes may be supported, for example, eight directional prediction modes and the DC mode (e.g., in H.264/AVC). Four prediction modes may be supported; horizontal, vertical, DC, and planar prediction, for example, for a luma block of size 16×16.

Furthermore, directional intra prediction modes and non-directional prediction modes may be supported.

Figure 5:
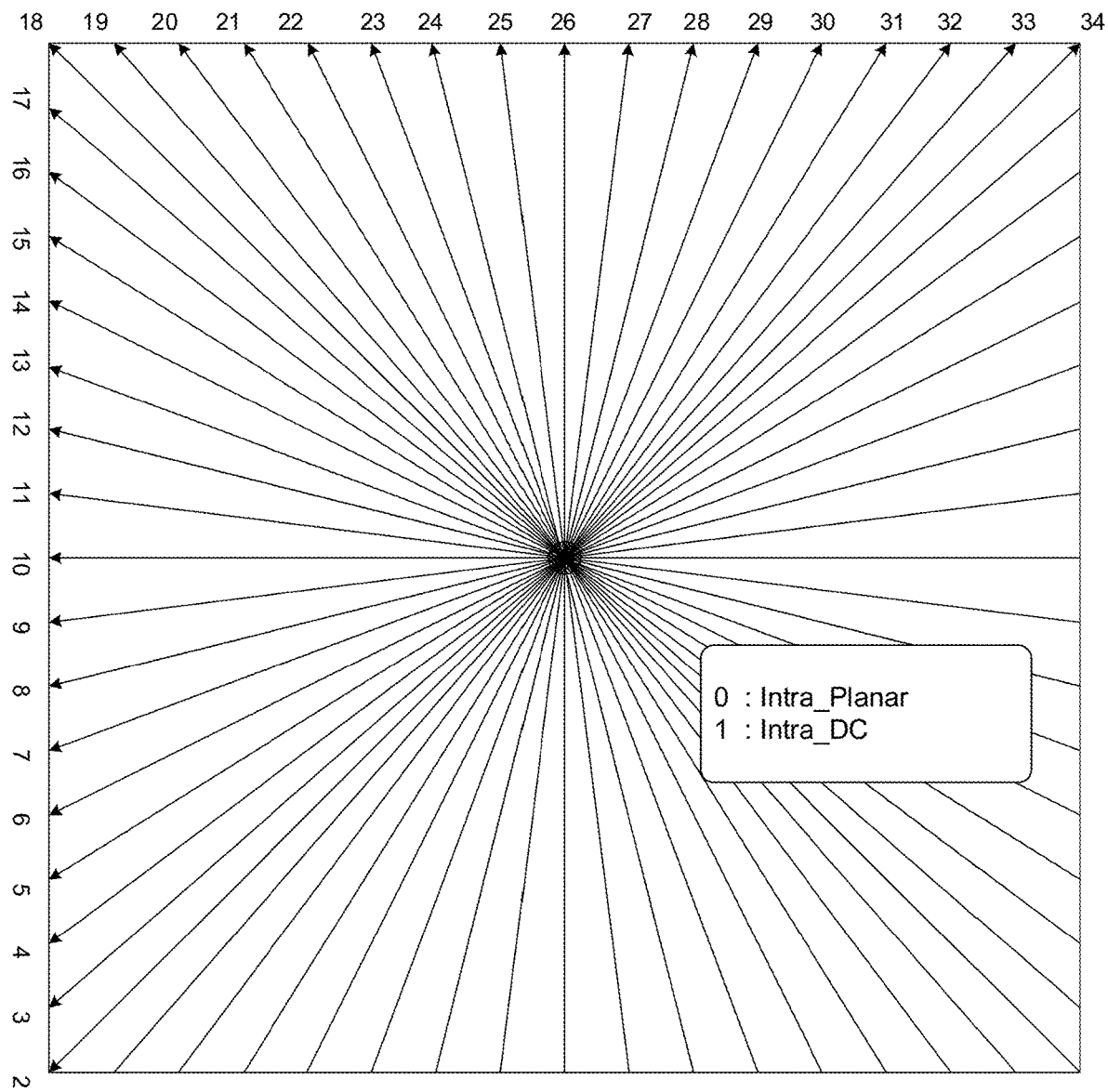
FIG. 5 is a diagram illustrating an example of 33 directional intra prediction modes and two non-directional intra prediction modes.

FIG. 5 is a diagram illustrating an example of 33 directional prediction modes and two non-directional prediction modes. The 33 directional prediction modes and two non-directional prediction modes, may be supported by HEVC. Spatial prediction using larger block sizes may be supported. For example, spatial prediction may be performed on a block of any size, for example, of square block sizes of 4×4, 8×8, 16×16, 32×32, or 64×64. Directional intra prediction (e.g., in HEVC) may be performed with 1/32-pixel precision.

Non-directional intra prediction modes may be supported (e.g., in H.264/AVC, HEVC, or the like), for example, in addition to directional intra prediction. Non-directional intra prediction modes may include the DC mode and/or the planar mode. For the DC mode, a prediction value may be obtained by averaging the available neighboring pixels and the prediction value may be applied to the entire block uniformly. For the planar mode, linear interpolation may be used to predict smooth regions with slow transitions. H.264/AVC may allow for use of the planar mode for 16×16 luma blocks and chroma blocks.

An encoder (e.g., the encoder 100) may perform a mode decision (e.g., at block 180 in FIG. 1) to determine the best coding mode for a video block. When the encoder determines to apply intra prediction (e.g., instead of inter prediction), the encoder may determine an optimal intra prediction mode from the set of available modes. The selected directional intra prediction mode may offer strong hints as to the direction of any texture, edge, and/or structure in the input video block. Angular intra prediction is designed to efficiently model different directional structures typically present in video and image content. The number and angularity of prediction directions are selected to provide a good trade-off between encoding complexity and coding efficiency for typical video materials.

Partitioning.

HEVC intra coding supports two types of prediction unit (PU) division, PART_2N×2N and PART_N×N, splitting a coding unit (CU) into one or four equal size PUs, respectively. FIG. 4 illustrates PART_2N×2N and PART_N×N partitions. PART_N×N is only available when the CU size is equal to the configured minimum CU size (e.g. 8×8).

For 4:2:0 chroma formats, an 8×8 CU that is split into four 4×4 PUs may have four luma prediction blocks (PBs), but only one 4×4 PB per chroma channel for one 8×8 intra coded block to avoid throughput impact caused by 2×2 chroma intra prediction blocks.

When a CU is split into multiple transform units (TUs), the intra prediction may be applied for each TU sequentially in the quad-tree Z scanning order instead of applying the intra prediction at PU level. This allows neighboring reference samples from previous reconstructed TUs that are closer to the current TU samples to be coded.

Generating Predicted Samples.

In exemplary embodiments, each predicted sample $P_{x,y}$ may be obtained by projecting its location to a reference row or column of pixels, applying the selected prediction direction, and interpolating a predicted value for the sample in 1/32 pixel accuracy. Interpolation in some embodiments is performed linearly utilizing the two closest reference samples $R_{i,0}$ and $R_{i+1,0}$ for vertical prediction (modes 18-34 as shown in FIG. 5) and $R_{0,i}$ and $R_{0,i+1}$ for the horizontal prediction (modes 2-17 as shown in FIG. 5). Details of an interpolation process that may be used are provided in J. Boyce, et. al., "Draft high efficiency video coding (HEVC) version 2, combined format range extensions (RExt), scalability (SHVC), and multi-view (MV-HEVC) extensions", Document no JCTVC-R1013. July 2014.

HEVC supports a total of 33 angular prediction modes as well as planar and DC prediction for luma intra prediction for all the PU sizes. HEVC defines three most probable modes (MPMs) for each PU based on the modes of the top and left neighboring PUs. Firstly, a flag is coded to indicate whether the prediction mode of the current block is in the MPM set or not. In the case when the current intra prediction mode is equal to one of the elements in the set of MPMs, only the index in the MPM set is transmitted to the decoder. Otherwise (the current prediction mode is none of the MPM modes), a 5-bit fixed length code is used to determine the selected mode outside the set of MPMs.

Reference Sample Smoothing.

A 3-tap smoothing filter may be applied to all reference samples when smoothing is enabled (e.g. when intra_smoothing_disabled_flag is set to 0 in HEVC). The filtering may further be controlled by the given intra prediction mode and transform block size. For 32×32 blocks, all angular modes except horizontal and vertical may use filtered reference samples. For 16×16 blocks, the modes not using filtered reference samples may be extended to the four modes (9, 11, 25, 27) (see directions in FIG. 5) closest to horizontal and vertical. For 8×8 blocks, only the diagonal modes (2, 18, 34) may use filtered reference samples, using for example techniques described in Jani Lainema, et. al., "Intra Coding of the HEVC Standard," IEEE Transactions on CSVT, Vol. 22, No. 12, December 2012.

Intra Prediction for Chroma Component.

For PBs associated with the chroma component, the intra prediction mode may be specified as either planar, DC, horizontal, vertical, 'DM CHROMA' mode. Table 1 shows an exemplary rule specifying the chroma component intra prediction mode given the corresponding luma PB intra prediction mode and the intra_chroma_pred_mode syntax element. The intra prediction direction of chroma component sometimes is mapped to diagonal mode '34'.

TABLE 1

Mapping between intra prediction direction and intra prediction mode for chroma.

| | Luma intra prediction direction, X | | | | |
|---|---|---|---|---|---|
| intra_chroma_pred_mode | 0 | 26 | 10 | 1 | Otherwise (0 <= X <= 34) |
| 0 | 34 | 0 | 0 | 0 | 0 |
| 1 | 26 | 34 | 26 | 26 | 26 |
| 2 | 10 | 10 | 34 | 10 | 10 |
| 3 | 1 | 1 | 1 | 34 | 1 |
| 4 (DM_CHROMA) | 0 | 26 | 10 | 1 | X |

When the DM CHROMA mode is selected and the 4:2:2 chroma format is in use, the intra prediction mode for a chroma PB is derived from intra prediction mode for the corresponding luma PB as specified in Table 2.

TABLE 2

Specification of intra prediction mode for 4:2:2 chroma.

| intra pred mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| intra pred mode for 4:2:2 chroma | 0 | 1 | 2 | 2 | 2 | 2 | 3 | 5 | 7 | 8 | 10 | 12 | 13 | 15 | 17 | 18 | 19 | 20 |
| intra pred mode | 18 | 19 | 20 | 21 | 22 | 23 | 24 | 25 | 26 | 27 | 28 | 29 | 30 | 31 | 32 | 33 | 34 | |
| intra pred mode for 4:2:2 chroma | 21 | 22 | 23 | 23 | 24 | 24 | 25 | 25 | 26 | 27 | 27 | 28 | 28 | 29 | 29 | 30 | 31 | |

Intra Boundary Filter.

Figure 6:
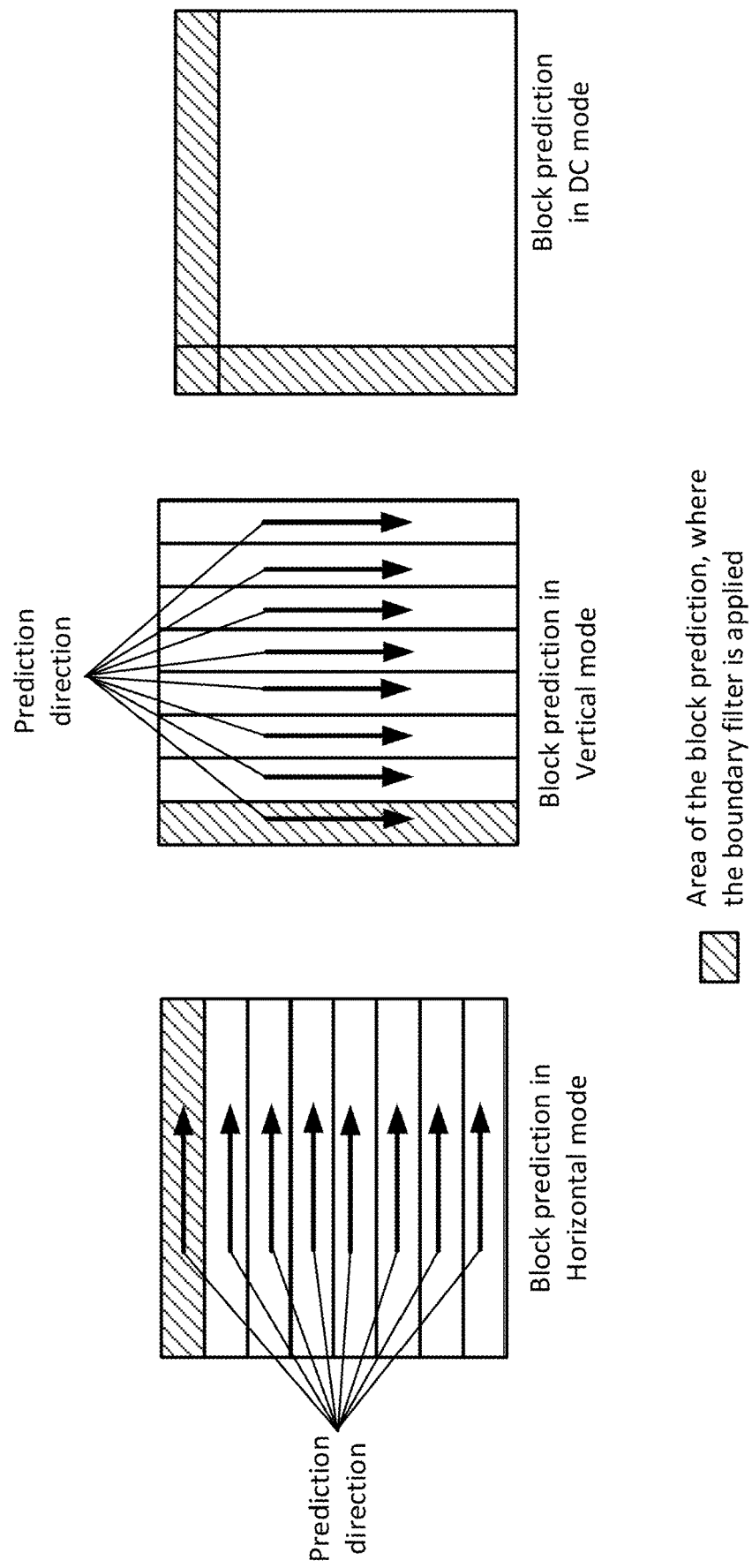
FIG. 6 is a diagram illustrating application of an intra boundary filter.

When reconstructing intra-predicted transform blocks (TBs), an intra-boundary filter may be used to filter the predicted luma samples along the left and/or top edges of the TB for PBs using horizontal, vertical and DC intra prediction modes, as shown in FIG. 6. Unlike the reference sample smoothing filters, intra boundary filters may be applied to boundary samples within the current TB.

In an exemplary embodiment, the intra boundary filter may be defined with respect to an array of predicted samples p as input and predSamples as output as follows. For horizontal intra-prediction applied to luma transform blocks of size (nTbS) less than 32×32, and boundary filtering enabled (disableIntraBoundaryFilter is equal to 0), the following filtering applies with x=0 . . . nTbS−1, y=0:

$$predSamples_{x,y}=Clip1_Y(P_{-1,y}+((P_{x,-1}-P_{-1,-1})>>1))) \quad (3)$$

For vertical intra-prediction applied to luma transform blocks of size (nTbS) less than 32×32, and disableIntraBoundaryFilter equal to 0, the following filtering applies with x=0 . . . nTbS−1, y=0:

$$predSamples_{x,y}=Clip1_Y(P_{x,-1}+((P_{-1,x}-P_{-1,-1})>>1))) \quad (4)$$

For DC intra-prediction applied to luma transform blocks of size (nTbS) less than 32×32 the following filtering applies with x=0 . . . nTbS−1, y=0 (where dcVal is the DC predictor):

$$predSamples_{0,0}=(P_{-1,0}+2*dcVal+P_{0,-1}+2)>>2 \quad (5)$$

$$predSamples_{x,0}=(P_{x,-1}+3*dcVal+2)>>2, \text{ with } x=1\ldots nTbS-1 \quad (6)$$

$$predSamples_{0,y}=(+3*dcVal+2)>>2, \text{ with } y=1\ldots nTbS-1 \quad (7)$$

The average improvement provided by the boundary smoothing is measured to be 0.4% in terms of Bjøntegaard Delta (BD) rate saving. The intra boundary filter is only applied on the luma component as the prediction for chroma components tends to be very smooth.

Transform for Intra Residual Coding.

For intra mode residual coding, HEVC utilizes intra mode dependent transforms and coefficient scanning for coding the residual information. A discrete sine transform (DST) is selected for 4×4 luma blocks and discrete cosine transform (DCT) is used for the all other types of blocks.

Linear Model Chroma Intra Prediction Mode.

During HEVC development, a linear-model (LM) based chroma intra prediction method was proposed. In this LM chroma prediction method, chroma samples are predicted from the collocated reconstructed luma samples using a linear model (LM) as follows:

$$Pred_C[x,y]=\alpha \cdot Rec_L[x,y]+\beta. \quad (8)$$

where $Pred_C$ indicates the predicted chroma samples in a block and $Rec_L$ indicates the corresponding reconstructed luma samples in the block. Parameters $\alpha$ and $\beta$ are derived from causal reconstructed luma and chroma samples around the current block, and thus do not need to be signaled.

Experimental results show that the average BD-rate reductions of Y, Cb, Cr components are 1.3%, 6.5% and 5.5% in All Intra test configuration. However, for low delay and random access configurations, the coding gain from this tool is smaller since they have fewer intra coded blocks.

Inter Coding.

Figure 7:
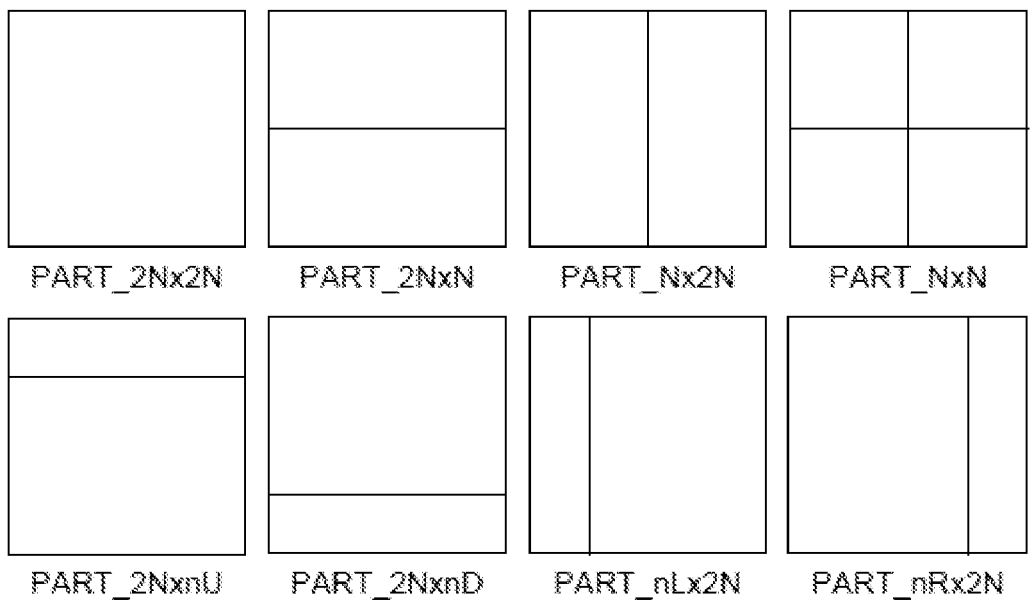
FIG. 7 is a diagram illustrating different partitions allowed for inter-prediction by HEVC.

Inter coding may be used to reduce temporal redundancy. Compared with intra-coding, HEVC supports more PU partition sizes. In addition to PART_2N×2N, PART_2N×N, PART_N×2N, PART_N×N as supported by intra prediction, there are additional 4 asymmetric motion partitions PART_2N×nU, PART_2N×nD, PART_nL×2N and PART_nR×2N supported by inter-picture prediction as shown in FIG. 7.

Figure 8A:
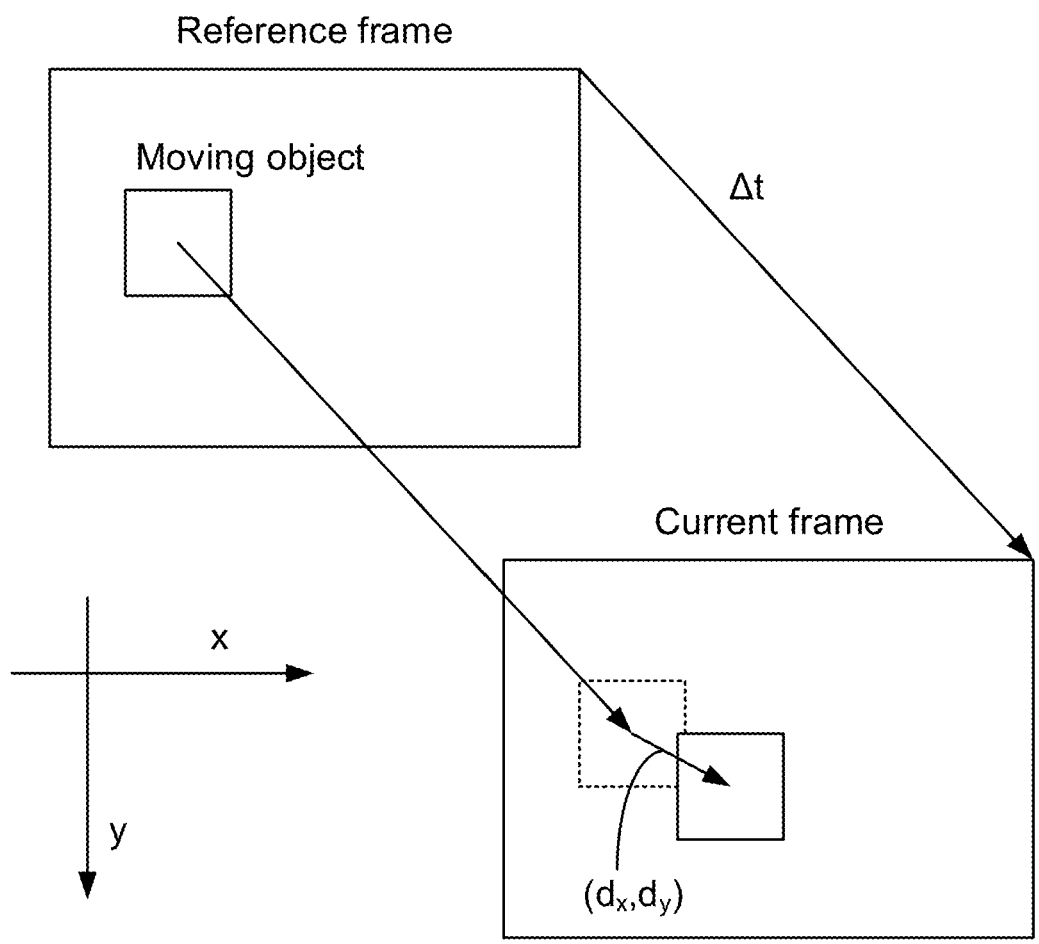
FIG. 8A is a diagram illustrating motion compensated prediction.
Figure 8B:
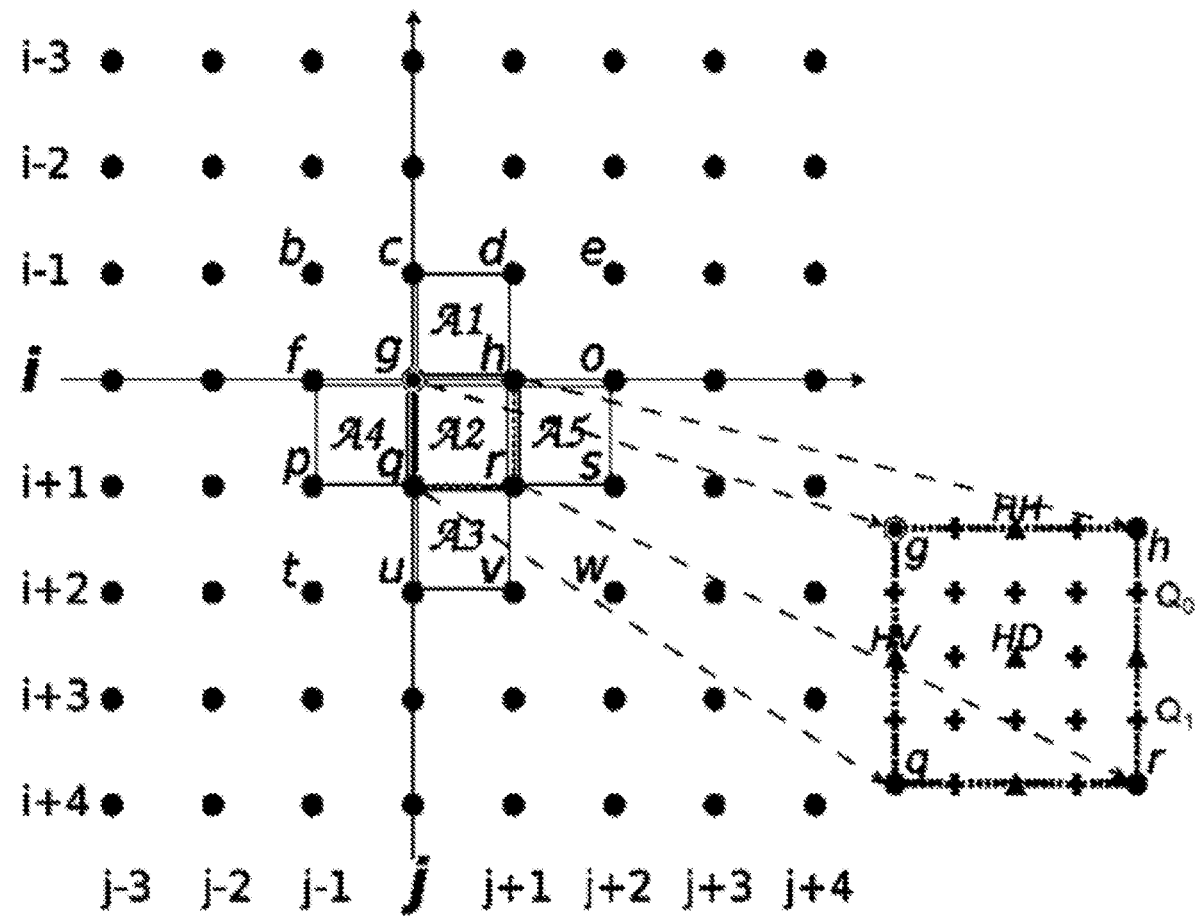
FIG. 8B is a diagram illustrating quarter pixel interpolation.

In an exemplary embodiment, each inter-prediction PU has a set of motion parameters consisting of one or two motion vectors and reference picture indices. A P slice only uses one reference picture list and a B slice may use two reference picture lists. The inter-prediction samples of the PB are obtained from those of a corresponding block region in the reference picture identified by a reference picture index, which is at a position displaced by the horizontal and vertical components of the motion vector (MV). FIG. 8A illustrates an example in which $d_x$ and $d_y$ are the horizontal and vertical motion vectors. When the motion vector has a fractional value, the fractional sample interpolation is used to generate the prediction samples for non-integer sample positions. This process is illustrated in FIG. 8B, where {'g', 'h', 'q', 'r'} are examples of integer pixels, and {'HD', 'HH', 'HV'} and {'$Q_0$', '$Q_1$'} are examples of pixels that are interpolated at half-pixel and quarter-pixel positions, respectively. HEVC supports MVs with units of ¼ of the distance between luma samples. For chroma, ⅛ precision is used between chroma samples in 4:2:0 format.

Motion vector prediction exploits spatial-temporal correlation of motion vectors with neighboring PUs. To reduce motion vector signaling cost, HEVC allows the merge code. In merge mode, a list of motion vector candidates from the neighboring PU positions (spatial neighbors and/or temporal neighbors) and/or zero vectors are included in the merge candidate list. The encoder can select the best predictor from the merge candidate list and transmit the corresponding index indicating the chosen candidate. The decoder will reuse the motion parameters of the selected merge candidate signaled by the encoder.

Lossless Coding.

The HEVC encoder can be configured to encode a video using lossless coding by operating in the tansquant bypass mode. In this mode, the transform and quantization, and its associated inverse processes both at the encoder and decoder are bypassed. This mode may be enabled by setting a Picture Parameter Set (PPS) syntax element transquant bypass enabled flag to one, which specifies that cu transquant bypass flag is present. The cu transquant bypass flag is also set to one which enforces quantization, transform, and in-loop filter processes are bypassed both at the encoder and decoder. In the present disclosure, the transquant bypass mode is referred to as the lossless coding mode.

Enhanced Prediction Methods for Inter and Intra Mode.

Hybrid video coding standards, including the HEVC, have the ability to code blocks within a frame using either an intra mode that exploits spatial redundancies, or inter mode that exploits temporal redundancies. In this disclosure, prediction systems and methods are described for intra and inter coding that demonstrate improved performance over existing methods. The exemplary systems and methods may be used with both lossy and lossless video coding.

Figure 9:
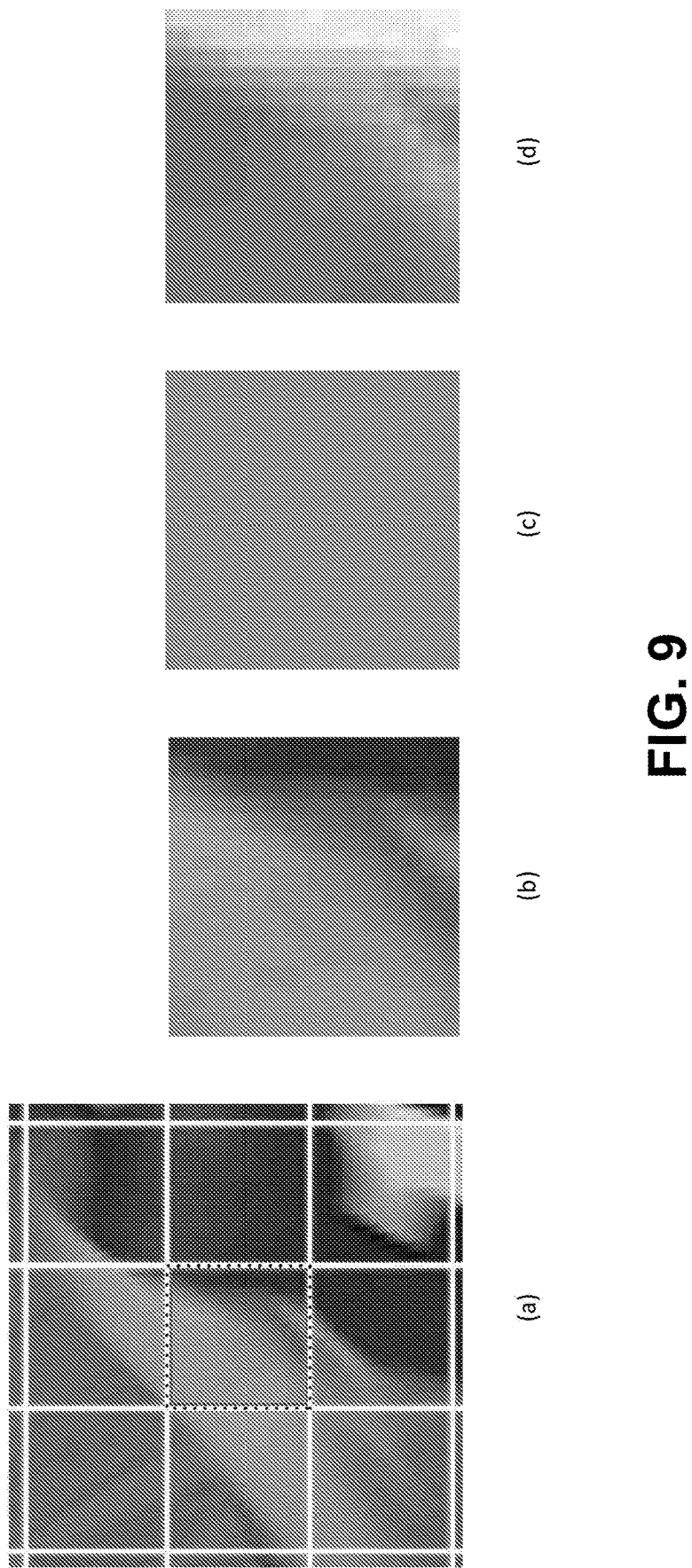
FIG. 9 is a diagram illustrating degradation of intra coding prediction quality toward the bottom right of a block. An original uncompressed segment of a video frame is illustrated at (a), with the dashed rectangle indicating the 16×16 block of interest shown enlarged at (b). The corresponding intra prediction block is illustrated at (c), and the difference block is illustrated at (c), where lighter color indicates larger difference.

The reference codec software for the exploration of next generation video coding technologies, JEM-1.0 software, includes 67 different intra prediction modes, which consists of 65 angular modes and two non-angular modes. These intra modes primarily use reconstructed pixels located on the left column and top row of the current block to generate a block of prediction pixels. Although this method is effective for predicting pixels that are closer to the left and top boundaries, the prediction suffers for those pixels located further away from these boundaries. An example of this problem is illustrated in FIG. 9, which shows an original uncompressed block (b), a corresponding intra prediction block (c), and the difference block (d). As seen in the difference image (d), the accuracy of prediction suffers for pixels closer to the right and bottom boundaries.

In an exemplary embodiment, an intra prediction mode is provided that predicts pixels using the nearest neighboring reconstructed pixels. Furthermore, exemplary prediction modes use a filter that has been derived using the neighboring reconstructed pixels. Exemplary embodiments therefore provide enhanced prediction by adapting to local image characteristics.

In another exemplary embodiment, systems and methods are provided for inter coding to improve motion compensated prediction. In such an embodiment, a filter is applied, where the coefficients of the filter have been derived to minimize the mean squared error between the prediction and reconstructed signal. In lossless coding, the reconstructed signal is equal to the original signal. Different techniques are described herein for deriving the filter coefficients either offline or online during the encoding/decoding process. By improving the motion compensated prediction, systems and methods described herein may improves the overall performance of inter coding.

In exemplary embodiments, nearest neighboring prediction is used to improve both intra and inter prediction in video coding. Systems and methods described herein use a filter derived from neighboring reconstructed pixels. In some embodiments, a Wiener filter (WF) is used for prediction. In some embodiments, as an alternative to the Wiener filter, other linear or nonlinear prediction filtering techniques may be used, such as least mean squares filtering or non-local mean filtering. The Wiener filter is a signal processing technique designed to yield predictions that minimize the mean squared error with respect to the actual signal. In some exemplary embodiments, there is no need to signal the filter coefficients to the decoder because the filter coefficients are derived from neighboring reconstructed pixels. Prediction methods described herein can be applied to components of different color spaces, such as, YCbCr, RGB, YCoCg, etc.

Intra Prediction using Wiener Filter.

In one embodiment of intra prediction described herein, pixel-based adaptive prediction is used where Wiener filter coefficients adapt on pixel-by-pixel basis. In another embodiment of intra prediction described herein, block-based adaptive prediction is used, where Wiener filter coefficients are fixed across an entire block of pixels but could vary on a block-basis. In these exemplary embodiments, the coefficients (e.g. Wiener filter coefficients) are derived at the encoder and decoder using reconstructed neighboring pixels. Since these pixels are not available for blocks along the frame boundary, in some embodiments, the use of this prediction mode may be disabled for transform units (TU) on the frame boundary.

Pixel-Based Adaptive Prediction using Wiener Filtering.

Exemplary embodiments disclosed herein include systems and methods for encoding and decoding video using a filter-based intra prediction mode (filter prediction mode). Details of exemplary filter prediction algorithms are further described.

Figure 10C:
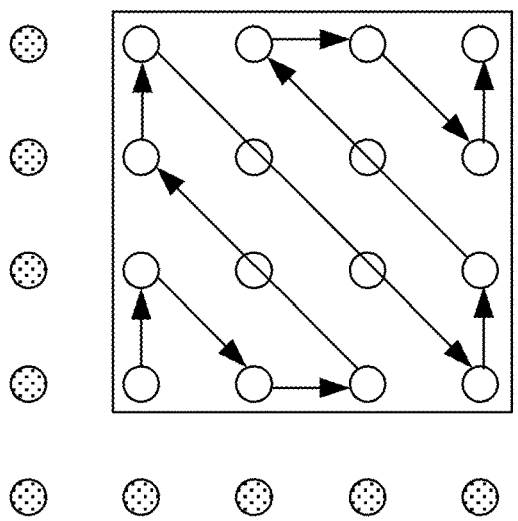
FIGS. 10A-10C are diagrams illustrating different coding directions for pixels in a transform unit (TU). Pixels in a TU are intra coded in either horizontal (FIG. 10A), vertical (FIG. 10B) or diagonal (FIG. 10C) scan order as illustrated. The shaded pixels represent the available neighboring reconstructed pixels.
Figure 10B:
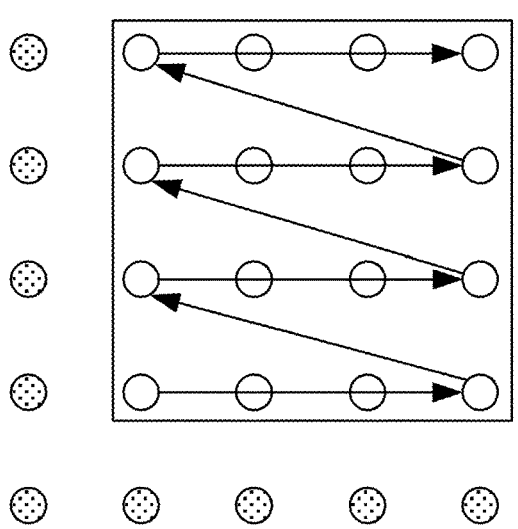
Figure 10A:
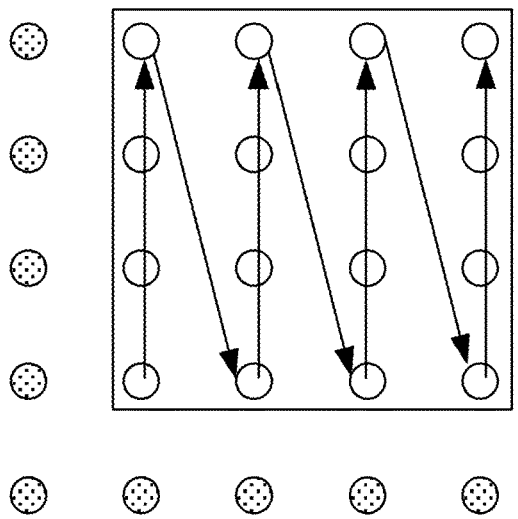

In an exemplary embodiment, an encoding process is described for a filter prediction mode. For the sake of clarity, the process is described with reference to a 4×4 TU block, although the methods described are not limited to that block size. In contrast to other intra modes, the filter prediction mode may operate on a pixel-by-pixel basis, in one of the scan orders shown in FIGS. 10A-10C (among other possible scanning orders). In some embodiments, the encoder adapts the scan order for subsequent TUs and may signal the new scan order as an additional syntax element in the bitstream.

Figure 11:
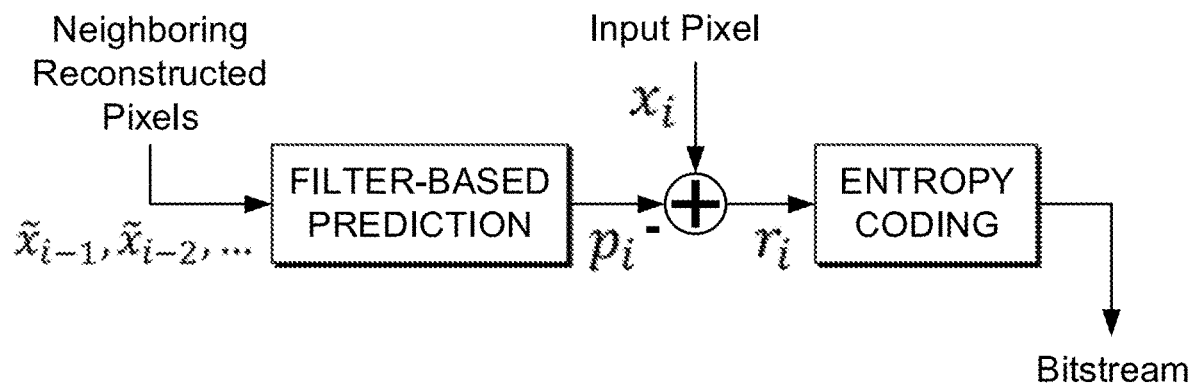
FIG. 11 is a functional block diagram illustrating an exemplary encoding process of the pixel-based adaptive Wiener filter prediction mode employed in some embodiments.

FIG. 11 is a block diagram illustrating an exemplary encoding process used in filter prediction mode for intra coding. For ease of explanation, the effects of quantization and transform are not considered. Given an input pixel $x_i$, the neighboring reconstructed pixels of that input pixel are used to derive the coefficients of the Wiener filter. The Wiener filter then is applied to the pixel to be predicted to generate prediction $p_i$. More details on Wiener filter prediction is given below. Residual $r_i$ is computed as $$r_i = x_i - p_i. \qquad (9)$$

These residuals within a TU may then be coded using an entropy coding technique such as Context Adaptive Binary Arithmetic coding and embedded into the bitstream.

In an embodiment where the encoding process does not consider quantization or transform, the reconstructed pixel derived at the encoder will be $$\begin{aligned}\tilde{x}_i &= r_i + p_i \\ &= x_i.\end{aligned} \qquad (10)$$

Figure 12:
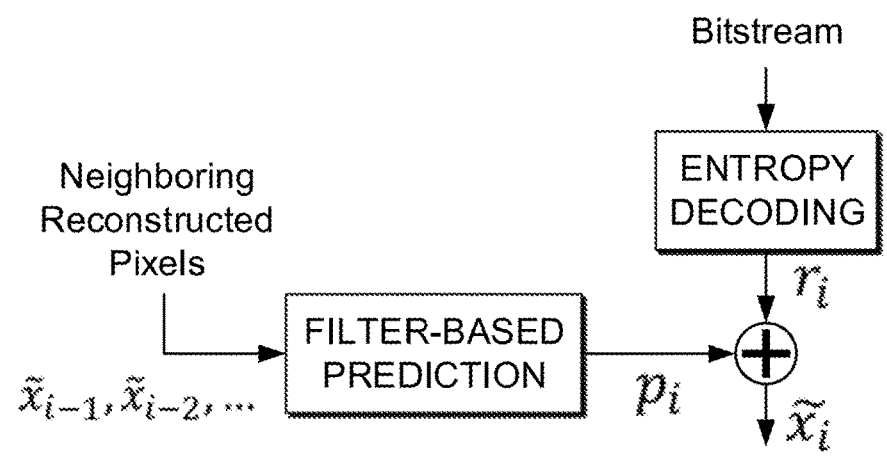
FIG. 12 is a functional block diagram illustrating an exemplary decoding process of the pixel-based adaptive Wiener filter prediction mode employed in some embodiments.

The reconstructed pixel is stored in the buffer and is made available for Wiener filter prediction of subsequent pixels. An exemplary decoding process used in filter prediction mode is illustrated in FIG. 12. The residual is obtained after entropy decoding, and is added to the Wiener filter prediction sample to generate the reconstructed pixel. The Wiener filter prediction process may be identical for both the encoding and the decoding processes (collectively referred to as coding processes). The filter-based prediction process is now described in greater detail.

Filter-Based Prediction.

Figure 13:
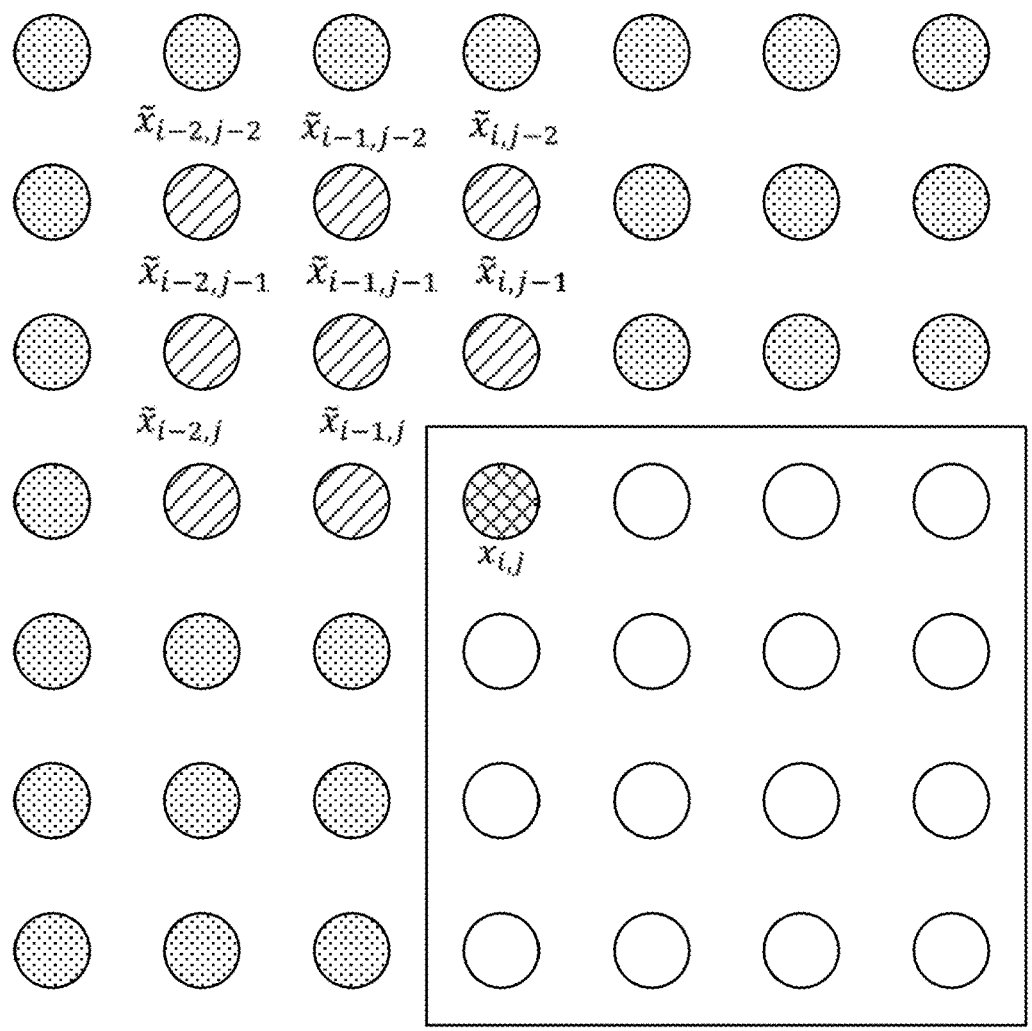
FIG. 13 is a diagram illustrating the locations and notation for training pixels associated with a current pixel $x_{i,j}$.
Figure 13:
Figure 13:
Figure 13:

The following notation is used in this description of filter-based prediction, such as Wiener filter prediction. Let $x_{i,j}$ correspond to the original input pixel at spatial location $(i,j)$, $\hat{x}_{i,j}$ denote its corresponding prediction pixel, and $\tilde{x}_{i,j}$ denote its reconstructed pixel. For a given input pixel $x_{i,j}$, for example shown in FIG. 13 consider N=8 neighboring reconstructed pixels $\tilde{x}_{i-2,j-2}, \ldots, \tilde{x}_{i-1,j}$ as training pixels. For each training sample $\hat{x}_{k,l}$ a linear prediction is generated using the neighboring reconstructed pixels. The Wiener filter pattern determines the pattern of neighboring pixels chosen during training. The filter pattern may be fixed across a block of pixels that is being predicted, or it may be adapted on a pixel-basis within a block. For example, when using a fixed filter pattern for horizontal scan order prediction, as in the scan of FIG. 10A, the filter pattern shown in FIG. 14A may be used for all pixels in a block. Similarly, for vertical scan order prediction, as in the scan order of FIG. 10B, the filter pattern shown in FIG. 14B may be used. Pixels belonging to the boundary of a TU may not have sufficient number of neighboring reconstructed pixels for applying a given fixed filter. For example, right boundary pixels face this situation when using fixed filter patterns for the horizontal scan order, and bottom boundary pixels face this situation when using fixed filter patterns for the vertical scan order. Instead, a filter pattern such as that illustrated in FIG. 14C may be used for these boundary pixels. Examples of additional filter patterns are shown in FIGS. 15A-15C.

A filter pattern may be adapted on a pixel-by-pixel basis. The choice of filter pattern for a given pixel may be based on the availability of associated neighboring reconstructed pixels, characteristics of the neighboring reconstructed pixels (e.g., edge gradient and direction), etc. The choice may be inferred, for example, by setting rules for choosing a filter pattern given available reconstructed pixels, or a filter pattern index may be signaled in the bitstream.

Consider a situation in which it is desirable to predict pixel $\hat{x}_{k,l}$ using its associated neighboring reconstructed pixels that are selected by the choice of filter pattern used. For example, when filter pattern in FIG. 14A is used, the linear prediction equation is $$\hat{x}_{k,l}=w_0\tilde{x}_{k-1,l}+w_1\tilde{x}_{k-1,l-1}+w_2\tilde{x}_{k,l-1}+w_3\tilde{x}_{k+1,l-1}, \quad (11)$$

where $W=[w_0, \ldots, w_3]$ are coefficients. Let X denote a vector of input pixels, and g its associated predictions, then coefficients W may be derived so as to minimize the mean square error (MSE) between original pixels and prediction pixel, as follows $$W = \operatorname*{argmin}_{W} \|X - \hat{X}\|^2. \quad (12)$$

The Wiener filter offers solution to the above equation. An approach to derive the filter coefficients is described as follows. A linear equation is constructed for a training pixel $\hat{x}_{k,l}$ using its neighboring reconstructed pixels, for example, as shown in FIG. 14A, as follows $$\hat{x}_{k,l}=w_0\tilde{x}_{k-1,l}+w_1\tilde{x}_{k-1,l-1}+w_2\tilde{x}_{k,l-1}+w_3\tilde{x}_{k+1,l-1}, \quad (13)$$

A linear equation is constructed for each of the N=8 training pixels, and the resulting system of linear equation is given by $$\begin{bmatrix} \tilde{x}_{i-2,j-2} \\ \vdots \\ \tilde{x}_{i-1,j} \end{bmatrix}_{N\times 1} = \begin{bmatrix} \tilde{x}_{i-3,j-2} & \cdots & \tilde{x}_{i-2,j-3} \\ \vdots & \ddots & \vdots \\ \tilde{x}_{i-2,j} & \cdots & \tilde{x}_{i,j-1} \end{bmatrix}_{N\times 4} \begin{bmatrix} w_0 \\ \vdots \\ w_3 \end{bmatrix}_{4\times 1}, \quad (14)$$

This equation can then be written as follows $$S = ZW \quad (15)$$

$$\begin{bmatrix} s_0 \\ \vdots \\ s_k \\ \vdots \\ s_{N-1} \end{bmatrix} = \begin{bmatrix} z_0 \\ \vdots \\ z_k \\ \vdots \\ z_{N-1} \end{bmatrix} \begin{bmatrix} w_0 \\ \vdots \\ w_3 \end{bmatrix}, \quad (16)$$

where $z_k$ is a row vector associated with a training pixel $s_k$. The coefficient vector W may be estimated by minimizing the mean squared error between the predicted sample $s_k$ and actual sample $s_k$. The least squares solution for coefficients W is given by $$W=(R_{zz})^{-1}r_{zs}, \quad (17)$$

where R is estimate of the covariance of $z_k$ defined as $$R_{zz} = \frac{1}{N}\sum_{k=0}^{N-1} z_k^t z_k, \quad (18)$$

and $r_{zs}$ is an estimate of the cross correlation between $z_k$ and $s_k$, defined as $$r_{zs} = \frac{1}{N}\sum_{k=0}^{N-1} z_k^t s_k. \quad (19)$$

The matrix inverse in Equation (17) can be computed using the Gaussian elimination algorithm, which involves floating point operations. Alternatively, matrix inverse can be computed using fixed point implementation, or other techniques may be used to invert the matrix $R_{zz}$.

A unique solution for coefficients W exists if the matrix R is invertible, or equivalently if determinant of R is not zero. However, for sufficiently small values of the determinant, the solutions for W may be unstable. Therefore, in exemplary embodiments, a threshold is applied to the determinant such that the coefficients in Equation (17) are used only when the following condition is true $$|\det(R_{zz})|>\text{thresh, where} \quad (20)$$

thresh=$2^{(bitdepth-8)+1}$, bitdepth is the internal bit depth used for encoding and decoding, bitdepth≥8, and I.I denotes the absolute value function, and det( ) denotes the matrix determinant. Other threshold values may alternatively be used.

It has been observed that at certain times, even where the condition in Equation (20) is satisfied, the coefficients derived have very large values that result in incorrect prediction. To avoid this, in some embodiments, the mean of the absolute values of coefficients is computed, and the coefficients are used for prediction only if the mean absolute value is no greater than a threshold thresh_2 as shown below.

$$\tfrac{1}{4}\Sigma_{k=0}^{3}|w_k|\leq\text{thresh\_2} \quad (21)$$

Through experimentation, it has been found that a thresh_2 being equal to 4 yields good results. Other threshold values may alternatively be used. If either condition in Equations (20) or (21) is false, coefficients of $w_k=\tfrac{1}{4}$ may be used, which is simple averaging like DC prediction. Otherwise, the solution from Equation (17) is used.

The predicted pixel may be computed as follows:

$$\hat{x}_{i,j}=w_0\tilde{x}_{i-1,j}+w_1\tilde{x}_{i-1,j-1}+w_2\tilde{x}_{i,j-1}+w_3\tilde{x}_{i+1,j-1}, \quad (22)$$

The Wiener filter coefficients derived above are floating-point values; fixed-point coefficients can also be derived. In one embodiment, the approach described in Chia-Yang Tsai, et al. "Adaptive loop filtering for video coding," IEEE Journal of Selected Topics in Signal Processing, Vol. 7, No. 6, pp. 934-945, December 2013, for use in adaptive loop filtering is used for deriving the fixed-point coefficients. In this approach, the coefficients are quantized suitably to provide 8 bit precision for the fractional part. Constraints may be imposed on the range of filter coefficient values, so that coefficients can be represented within 10-bits.

Block-Based AWF Prediction.

The exemplary filter prediction mode described above generates Wiener filter coefficients for each pixel, and therefore the Wiener filter is pixel adaptive. In some embodiments, one set of Wiener filter coefficients is used uniformly across all pixels within a block. This approach reduces the computational complexity both at the encoder and decoder, since it is not necessary to estimate coefficients for each pixel.

Figure 16:
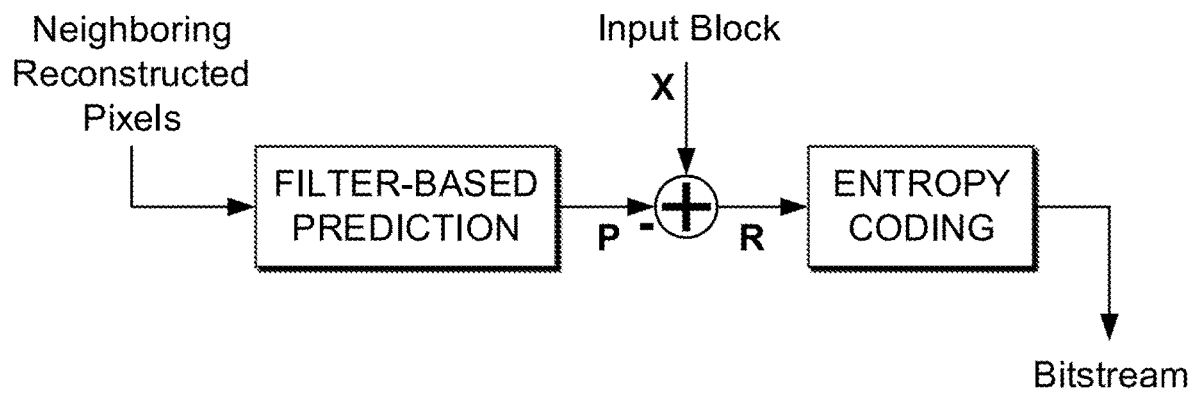
FIG. 16 is a functional block diagram illustrating an exemplary encoding process for a block-based adaptive Wiener filter mode.

A block diagram illustrating an exemplary encoding process is provided in FIG. 16. Again, for ease of explanation, the effects of quantization and transform during encoding and decoding process are not explicitly described, though they may be implemented in embodiments. The encoder predicts the pixels in a TU using a scan order such as one of the scan orders of FIGS. 10A-10C. The encoder may signal the chosen scan order in the bitstream. During WF prediction, the WF coefficients are estimated once per TU, using the neighboring reconstructed pixels, following the procedure described above. In pixel-based adaptive prediction, reconstructed samples of previously encoded pixels within a TU are available during the prediction process of subsequent pixels. However, in the block-based approach the reconstructed pixels of the current TU are not available during the encoding process. Therefore prediction is performed using neighboring reconstructed pixels on block boundaries and previously predicted pixels in the TU. This prediction process may be performed iteratively in specified scan order, to obtain prediction block P.

The Wiener filter coefficients may be estimated offline or online. In an online approach, the coefficients are estimated using neighboring reconstructed pixels on the top and left of the current TU. During coefficient estimation, a greater number of training pixels may be considered compared to the pixel-based adaptive scheme (e.g. N>8), since coefficients are estimated once for an entire block. This would require availability of more number of neighboring reconstructed pixels.

In an offline approach, the Wiener filter coefficients are estimated offline, categorized based on certain criteria, and stored in lookup tables (LUT). During filter based prediction, appropriate coefficients are chosen from the LUT for a TU, based on the category it belongs to. Described below are different categories of coefficients and associated processes of selecting those categories from a LUT during the WF prediction.

Some embodiments make use of block size-based categorization. In this approach, Wiener coefficients are estimated for each valid size of TU. During the filter based prediction process, appropriate coefficients are fetched from the LUT based on the current TU size.

Some embodiments make use of intra mode-based categorization. In this approach, filter based prediction is not considered as a separate intra prediction mode, but it rather accompanies an existing intra mode. Wiener filter coefficients are estimated offline for each intra mode. In the encoding process, intra prediction modes are first applied to the given TU and the best mode is found based on the rate-distortion (RD) cost. Appropriate Wiener filter coefficients are selected from the LUT using the best intra mode, and those coefficients are used for filter based prediction that operates on neighboring reconstructed pixels. If the RD cost is smaller when using the filter based mode, then the encoder may signal a flag WF flag equal to one in the bitstream; otherwise a zero is signaled. The signaling for the best intra mode remains unchanged. In the decoding process, if the WF flag is equal to one, then the decoder uses the signaled intra mode for selecting the Wiener filter coefficients from the LUT for predicting the TU. In another embodiment, the intra modes of the neighboring PUs are used to select the Wiener filter coefficients from the LUT. The WF flag is still signaled in the bitstream to indicate the use of WF prediction to the decoder.

Some embodiments make use of block size and intra mode-based Wiener filter weights. Such embodiments may be understood as a combination of block size-based categorization and intra mode-based categorization. Wiener filter coefficients are estimated for different block sizes and intra modes, and stored in a LUT. During WF prediction, the coefficients are chosen based on both the TU size and the intra mode.

Figure 17:
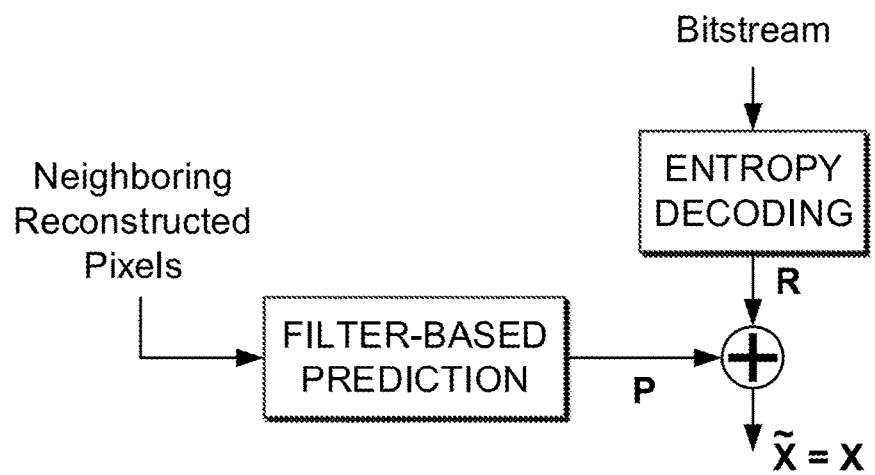
FIG. 17 is a functional block diagram illustrating an exemplary decoding process for a block-based adaptive Wiener filter mode.

The prediction block P is subtracted from the input block X to generate block of residuals R, which are then entropy coded. The decoding process is illustrated in FIG. 17, and it follows the reverse procedure of the encoding process. The residual block R corresponding to a TU is decoded from the bitstream and added to the block-based WF prediction to yield decoded block X.

Filter Prediction Mode Signaling.

Figure 18:
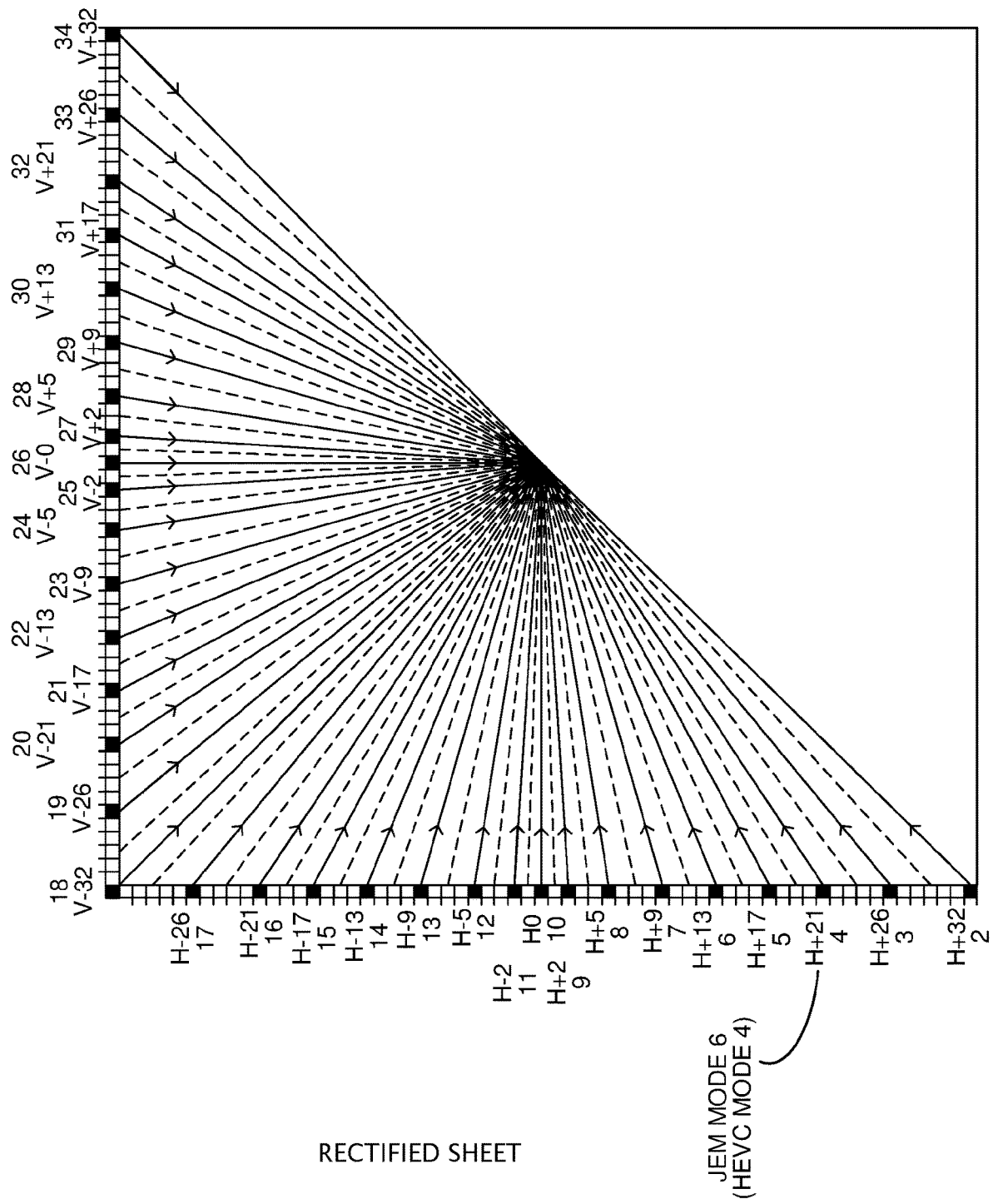
FIG. 18 is a diagram illustrating prediction directions for intra mode in JEM-1.0. The solid lines correspond to the HEVC intra mode directions, which are a subset of the JEM modes. The numbers are the mode numbers for HEVC.

The Joint Exploration Model JEM-1.0 considers 67 different intra modes. Among them, 65 are angular modes, and the remaining two are DC and planar modes. Since the most frequently occurring modes are the non-angular modes and the horizontal and vertical modes, in some embodiments, one of the angular modes (preferably not a frequently-occurring mode) is replaced with a filter based prediction mode. In one embodiment, JEM intra mode number 6 (or HEVC mode 4) is replaced by the filter based prediction mode, since mode 6 is close to a 45 degrees angle, as illustrated in FIG. 18. In other embodiments, angular modes other than 6 may be chosen for the filter based prediction mode, or an additional filter based prediction mode may be added on top of the existing set of 67 modes.

Combining WF Mode with other Intra Modes.

A typical intra angular prediction mode is able to perform well when a block contains pure edge angles. However, natural video often contains angular edges that have textural variation, e.g. where the edge itself is textured, or there is an illumination variation in the edge region, or there is camera noise, or there are other weak edges in different directions. Since Wiener filter prediction adapts well to local pixel variation, a combination of Wiener filter prediction with an intra angular prediction mode may provide improved prediction for angular edges with textural variations.

Two exemplary techniques for combining filter based prediction with intra prediction are described in detail, namely (1) the use of a weight average between filter-based and other intra prediction, and (2) the use of filter-based prediction in tandem with other intra prediction. The filter based prediction used in these techniques may either be pixel-based adaptive or block-based adaptive. The effects of quantization and transform are again excluded from the following discussion to facilitate ease of explanation.

Weighted Averaging of WF Prediction with Other Intra Prediction.

In methods described above, the filter based prediction mode is generally used as a separate intra prediction mode. In alternative embodiments, a prediction block may be generated as a weighted average between the filter based prediction $P_{WF}$ and existing intra mode prediction $P_{intra}$, as follows $$P = gP_{intra} + (1-g)P_{WF} \quad (23)$$

Figure 19:
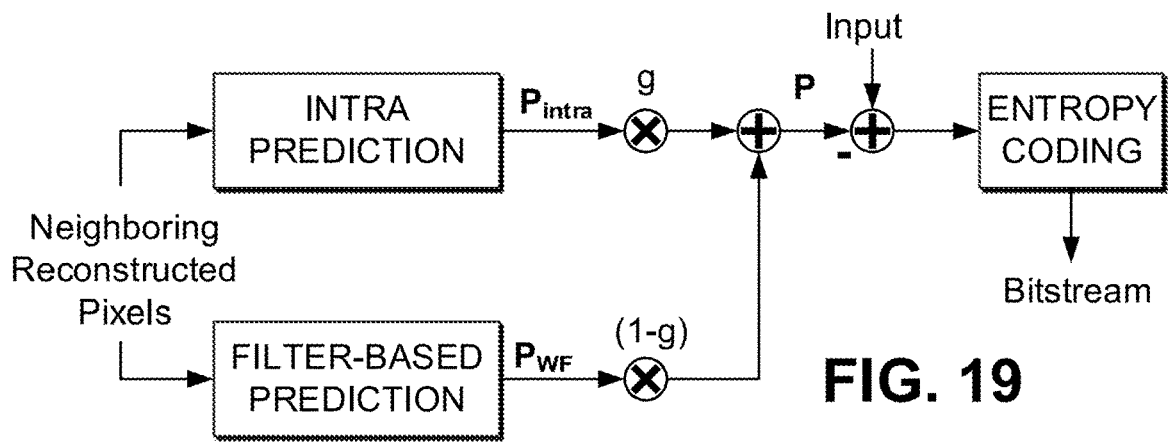
FIG. 19 is a functional block diagram of an encoding process that combines existing intra prediction with Wiener filter intra prediction.

An exemplary block diagram of this scheme is provided in FIG. 19. The use of this combined intra mode may be signaled at the PU/CU level in the bitstream via a flag. In one embodiment, the weight g is selected from a set of candidate weights, and the weight that minimizes the RD cost during mode selection is chosen, and its index signaled for each PU or CU in the bitstream. In another embodiment, the weight g that minimizes the MSE between P and input X is determined, and its value is signaled directly in the bitstream. Alternatively, multiple weights can be signaled at the slice level, which can be determined based on a previously coded picture, and the index of the weight to be used is signaled at the block level. In another embodiment, the weight g may be derived using neighboring reconstructed pixels (left neighboring pixels and top neighboring pixels) as the template, in which case the weight need not be signaled explicitly.

Using WF Prediction in Tandem with other Intra Prediction.

Figure 21:
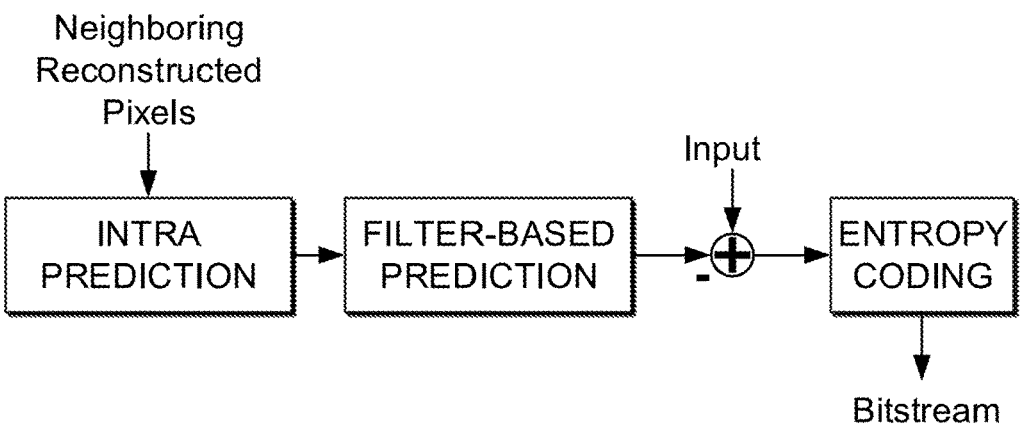
FIG. 21 is a functional block diagram of an encoding process that uses Wiener filter prediction in tandem with intra prediction in some embodiments.

In some embodiments, prediction generated by an existing intra mode is improved by applying filter based prediction to it, as shown in FIG. 21. A flag may be signaled at PU/CU level to indicate whether or not the filter based prediction is enabled. Different techniques may be used to signal the Wiener filter coefficients. In some embodiments, the coefficients are provided implicitly. In such an embodiment, the Wiener filter coefficients are derived from neighboring reconstructed pixels. In some embodiments, the coefficients are signaled explicitly. For example, the Wiener filter coefficients may be estimated offline for TU size and intra prediction direction and stored in a lookup table (LUT). At the encoder and decoder, the WF coefficients may be chosen appropriately from the LUT, using the TU size and intra prediction mode information. In an alternate approach, the WF coefficients for the TU size and intra prediction mode are generated at the encoder to minimize the MSE between the WF prediction and input block, and the coefficients are signaled at slice level or picture level in the bitstream to avoid a large signaling overhead.

Figure 20A:
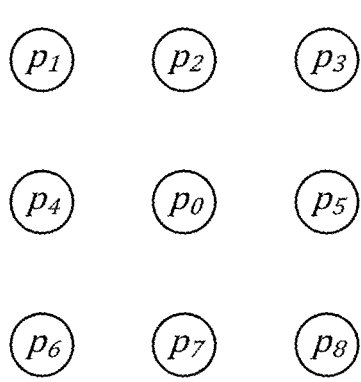
FIGS. 20A-20B are diagrams illustrating examples of Wiener filter patterns for Wiener filter prediction when used in tandem with existing intra prediction. The filter patterns are centered at pixel $p_0$. Pixel $p_i$ represents a prediction pixel generated by intra prediction.
Figure 20B:
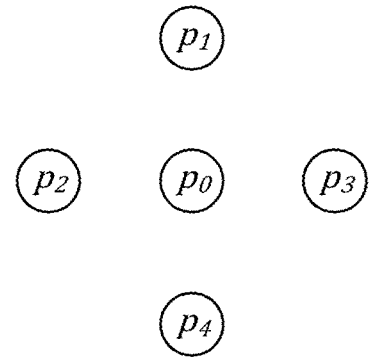

Since the WF prediction is applied on an intra prediction block, pixels surrounding the to-be-filtered pixel location can be used by the Wiener filter. For example, filter patterns such as square and diamond shaped filters can be used, as shown by square pattern (FIG. 20A) and diamond pattern (FIG. 20B). Let $p_i$ correspond to a pixel generated by an existing intra prediction mode, and operated on by a Wiener filter. When using a square filter of FIG. 20A, the Wiener filter operates on intra prediction pixels $p_0, \ldots, p_8$ to yield a new prediction pixel for center pixel position $p_0$.

In cases where the Wiener filter uses all predictions signals, there is no dependency between the Wiener filter and the pixel reconstruction process. However, the Wiener filter prediction process can be improved if the Wiener filter is applied on the reconstructed pixel. Nevertheless, this calls for the pixel reconstruction to be performed pixel by pixel in the coding order, before the Wiener filter is applied. Suppose the coding order is the horizontal direction. The samples used in Wiener filtering the top and left neighboring positions of the pixel to be filtered (e.g. p1, p2, p3 and p4 in the pattern of FIG. 20A) can be reconstructed samples instead of predictions, while those samples at bottom and right positions are predictions (e.g. p5, p6, p7, p8 in the pattern of FIG. 20A).

Wiener Filter Mode for Inter Coding.

Various different techniques may be used to improve motion compensated prediction (MCP) using Wiener filtering thereby improving the performance of inter frame coding. Three such techniques are described in detail below, namely (1) using implicit signaling, (2) using explicit signaling, and (3) combining filter-based prediction with inter prediction. In the case of intra coding, the Wiener filtering pattern is generally restricted to operating on reconstructed pixels that are on the top or left of the pixel-of-interest position. However, in filter based prediction mode for inter coding, it is possible to operate on all MCP pixels surrounding and including the pixel-of-interest position. The use of Wiener filtering for inter coding exploits correlation of all neighboring pixels for improved prediction. For ease of explanation, the schemes presented here do not describe quantization and transform steps.

Improving Motion Compensated Prediction using Wiener Filtering with Implicit Signaling.

Figure 22A:
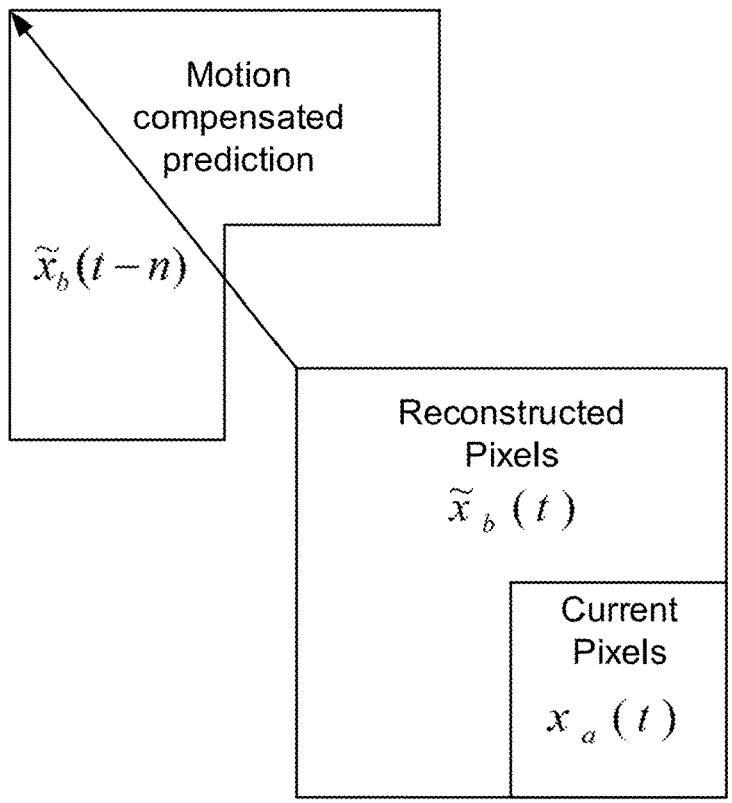
FIGS. 22A-22B are diagrams illustrating motion compensated prediction for a neighboring block of pixels whose reconstruction is $\bar{x}_b(t)$ (FIG. 22A) and for a current block of pixels $x_a(t)$ (FIG. 22B).
Figure 22B:
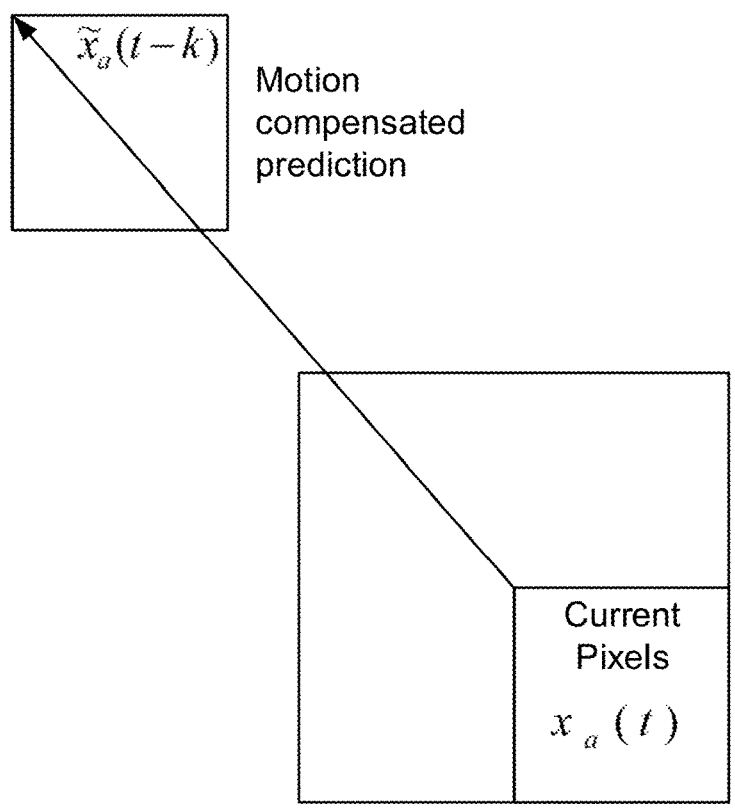
Figures 23, 24:
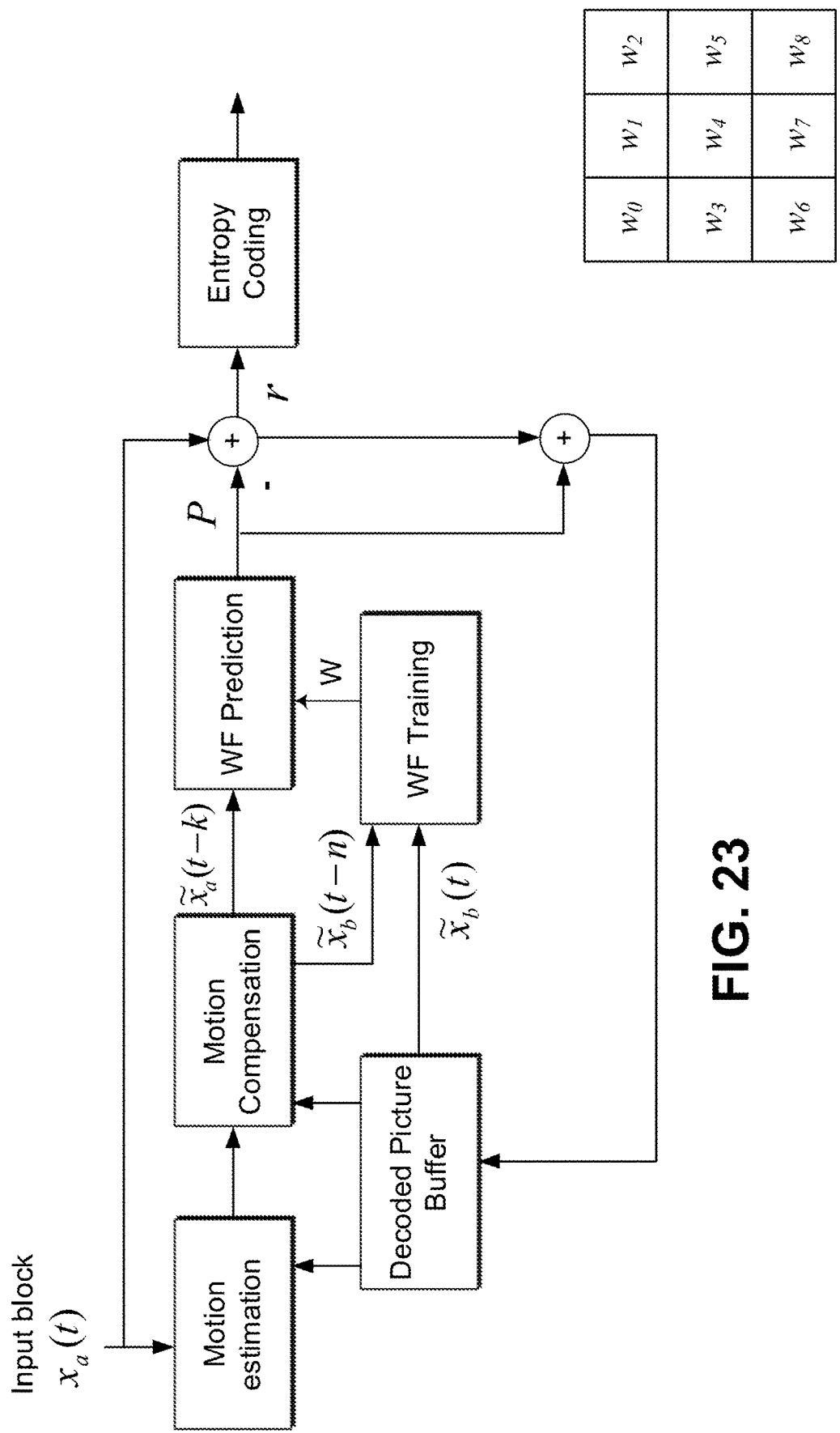
FIG. 23 is a functional block diagram illustrating an encoding process that uses Wiener filtering for improving motion compensated prediction without signaling the Wiener filter coefficients. The neighboring reconstructed block of pixels $\bar{x}_b(t)$ and its associated motion compensated prediction (MCP) 54, (t n) are used for training the Wiener filter coefficients. The Wiener filter prediction is applied to the MCP of current block $\bar{x}_a(t-k)$ to yield prediction P.
FIG. 24 is a diagram illustrating a 3×3 Wiener filter pattern.

In some embodiments, Wiener filter coefficients are derived from the neighboring reconstructed pixels and associated motion compensated prediction. A block diagram of such a method is provide in FIG. 23. The method is further described with respect to an example illustrated in FIG. 22A. Let $x_a(t)$ denote current block of pixels under consideration, and $x_b(t)$ denote its associated neighboring block of pixels that have already been encoded. Let $\tilde{x}_b(t)$ denote the reconstructed pixels of the neighboring block, and let $\tilde{x}_b(t\ n)$ be its associated motion compensated prediction from a reference frame. Consider $\tilde{x}_b(t)$ to cover a larger area of pixels when compared to $x_a(t)$ since $\tilde{x}_b(t)$ is used for the derivation of filter coefficients. In one embodiment, a 3×3 filter pattern may be used as shown in FIG. 24.

Consider for example an instance where it is desirable to predict a sample from neighboring block 'b' $\hat{x}_b(t,i,j)$ by applying a filter on its motion compensated prediction pixels as follows $$\hat{x}_b(t,i,j)=w_0\tilde{x}_b(t-n,i-1,j-1)+w_1\tilde{x}_b(t-n,i,j-1)+w_2\tilde{x}_b(t-n,i+1,j-1)+w_3\tilde{x}_b(t-n,i-1,j)+w_4\tilde{x}_b(t\leq n,i,j)+w_5\tilde{x}_b(t-n,i+1,j)+w_6\tilde{x}_b(t-n,i-1,j+1)+w_7\tilde{x}_b(t-n,i,j+1)+w_8\tilde{x}_b(t-n,i+1,j+1), \quad (24)$$

It is desired to determine coefficients $W=[w_0, \ldots, w_8]$ that minimize the MSE between reconstructed pixels $\tilde{x}_b(t)$ and prediction pixels $\hat{x}_b(t)$ as follows $$W = \mathrm{argmin}_W \|\tilde{x}_b(t) - \hat{x}_b(t)\|^2. \quad (25)$$

The Wiener filter is the solution to the above equation. A procedure such as that described in greater detail above may be used to derive the Wiener filter coefficients. Once the coefficients are derived, they may be used for predicting reconstructed pixels of the current block $x_a(t)$ as follows $$\hat{x}_a(t,i,j)=w_0\tilde{x}_a(t-n,p-1,q-1)+w_1\tilde{x}_a(t-n,p,q-1)+w_2\tilde{x}_a(t-n,p+1,q-1)+w_3\tilde{x}_a(t-n,p-1,q)+w_4\tilde{x}_a(t\leq n,p,q)+w_5\tilde{x}_a(t-n,p+1,q)+w_6\tilde{x}_a(t-n,p-1,q+1)+w_7\tilde{x}_a(t-n,p,q+1)+w_8\tilde{x}_a(t-n,p+1,j+1), \quad (26)$$

where spatial indices $(p,q)=(i+mv_x, j+mv_y)$, and $(mv_x, mv_y)$ are the associated displacements due to motion along the x and y axis, respectively. These prediction pixels are used further in the encoding process for generating the residual block, etc. It should be noted that where lossless coding is performed, reconstructed pixels are identical to the original pixels, i.e., $x(t)=x(t)$, but this distinction in notation is retained for clarity of explanation.

Improving Motion Compensated Prediction using WF with Explicit Signaling.

Figure 25:
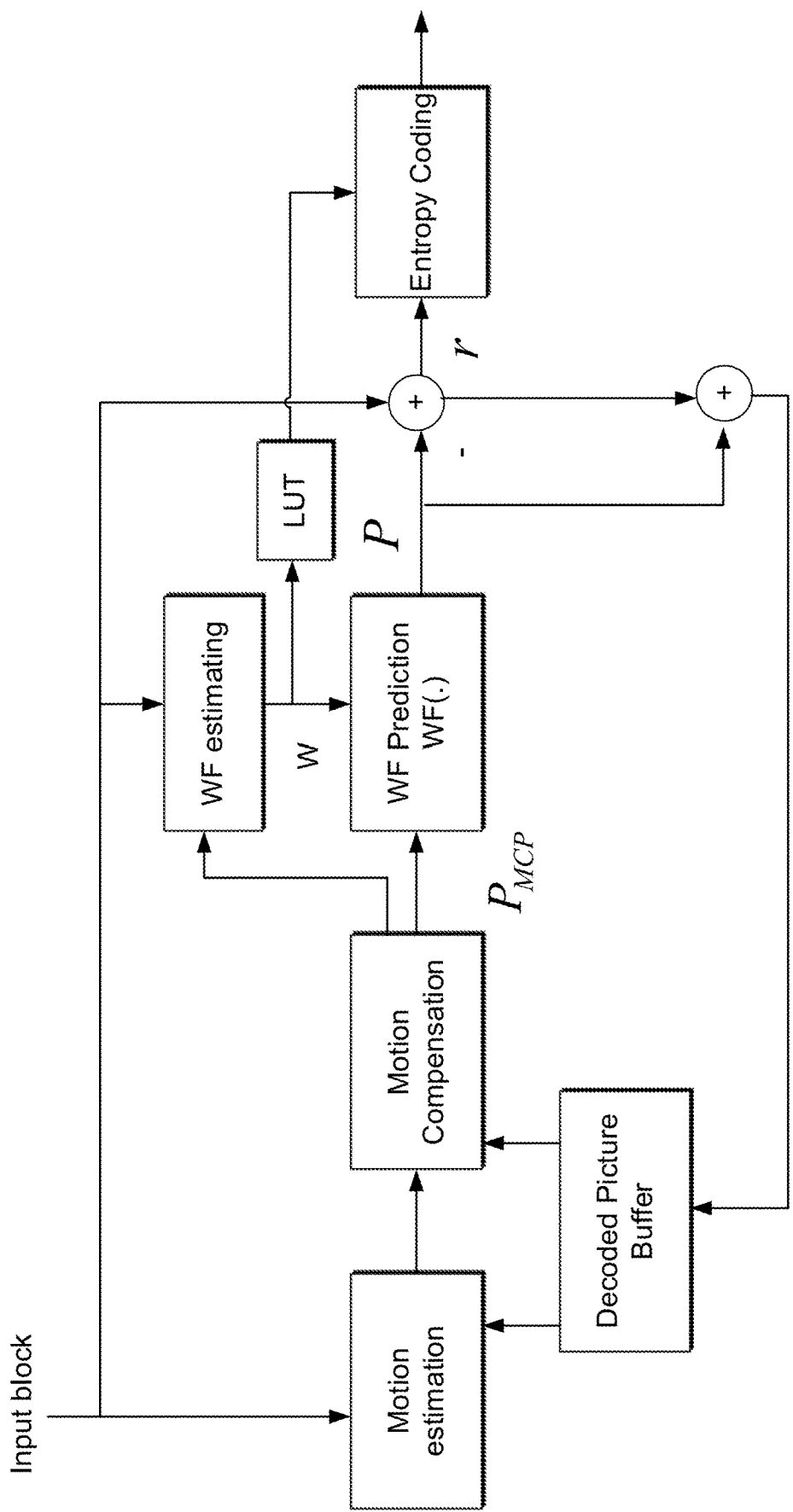
FIG. 25 is a functional block diagram illustrating an encoding process that uses Wiener filtering for improving motion compensated prediction, where Wiener filter coefficients are signaled in the bitstream.

In some embodiments, the motion compensation prediction block is improved by estimating the Wiener filter whose coefficients minimizes the MSE between the motion compensated prediction block and input block of pixels, as follows $$W = \mathrm{argmin}_W \|X - WF(P_{MCP})\|^2, \quad (27)$$

where WF( ) is a function that performs Wiener filter prediction using coefficients W. An exemplary block diagram for this scheme is provided in FIG. 25. The input block and its associated MCP may be used to estimate the Wiener filter coefficients. These coefficients are stored in a LUT and are categorized based on PU size and the edge direction of the MCP. The edge direction of the MCP can be derived using an approach such as the Sobel operator. To reduce the signaling overhead, the LUT may be signaled for each slice. The encoder may signal the LUT index corresponding to the Wiener filter coefficients used, or the index may be inferred at the decoder. If the index is inferred, the decoder may compute the edge direction of MCP for each PU and use it together with the PU size to determine the LUT index. Although inferring indices saves bits, it increases the computational complexity of the decoder.

Combining Filter-Based Prediction with Inter Prediction.

Filter-based intra prediction exploits local spatial correlation, and it can be combined with inter prediction which exploits temporal correlation. This combination can reap benefits from both spatial and temporal correlations. One exemplary approach for improving the inter-prediction is to employ weighted averaging of the motion compensated prediction $P_{MCP}$ and the filter based intra prediction $P_{WF}$ as follows $$P=gP_{MCP}+(1-g)P_{WF} \qquad (28)$$

Figure 26:
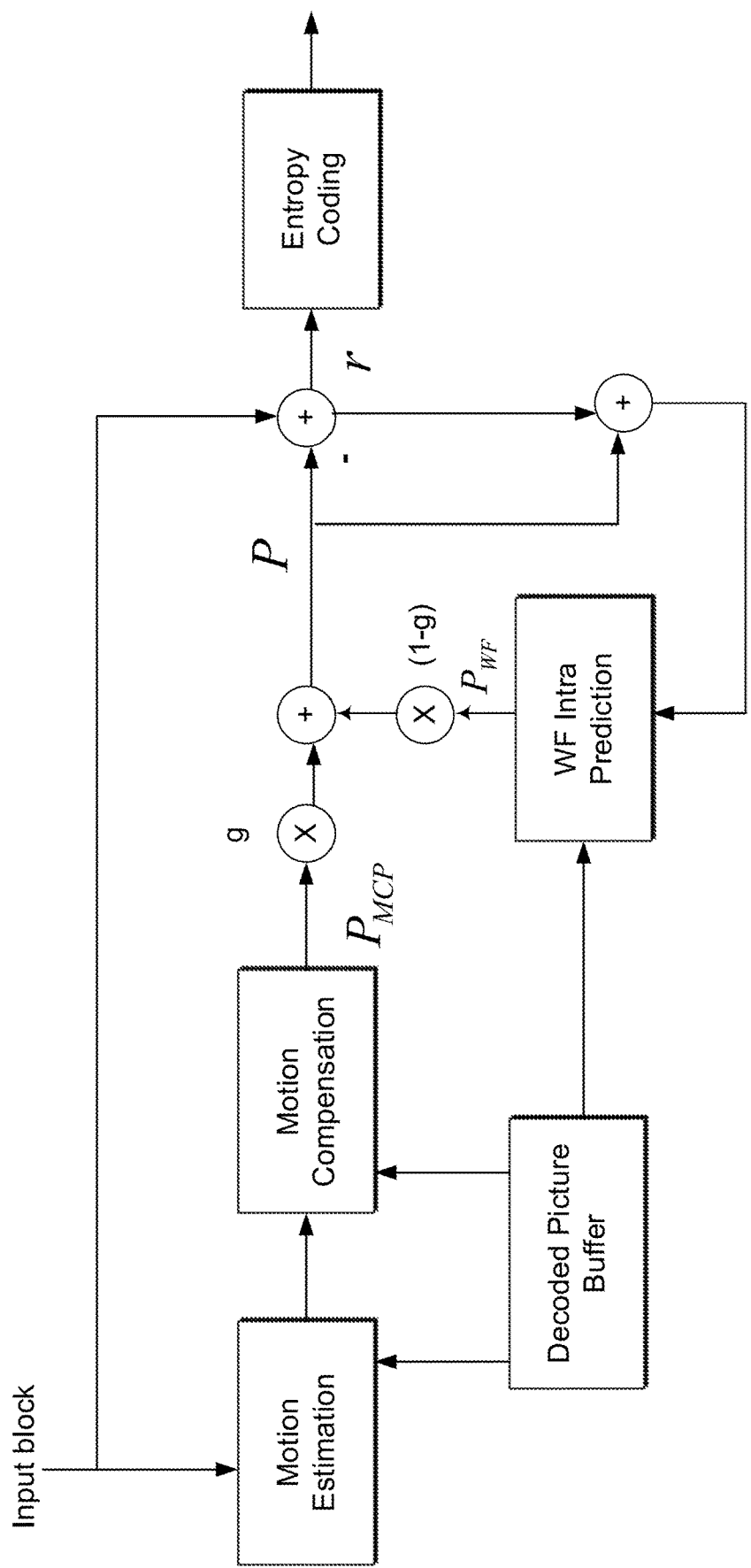
FIG. 26 is a functional block diagram illustrating an encoding process that uses a weighted combination of motion compensated prediction and Wiener filter intra prediction.

FIG. 26 illustrates an exemplary encoding process using this approach. The use of this combined mode may be signaled in the bitstream via a filter based prediction mode enabling flag. The enabling flag signaling can be conditioned with the quantized residuals of the CU/TU. Only when the quantized residuals have at least one non-zero residual, the WF enabling flag is signaled. Otherwise, the enabling flag is inferred as 0. In one embodiment, the weighting factor g is selected from a set of candidate weights, and the weight that minimizes the RD cost is chosen, and its index signaled in the bitstream. In another embodiment, the weight g that minimizes the MSE between P and the input is determined, and its value is signaled in the bitstream.

WF-Mode-Based Residual Prediction.

Figure 27:
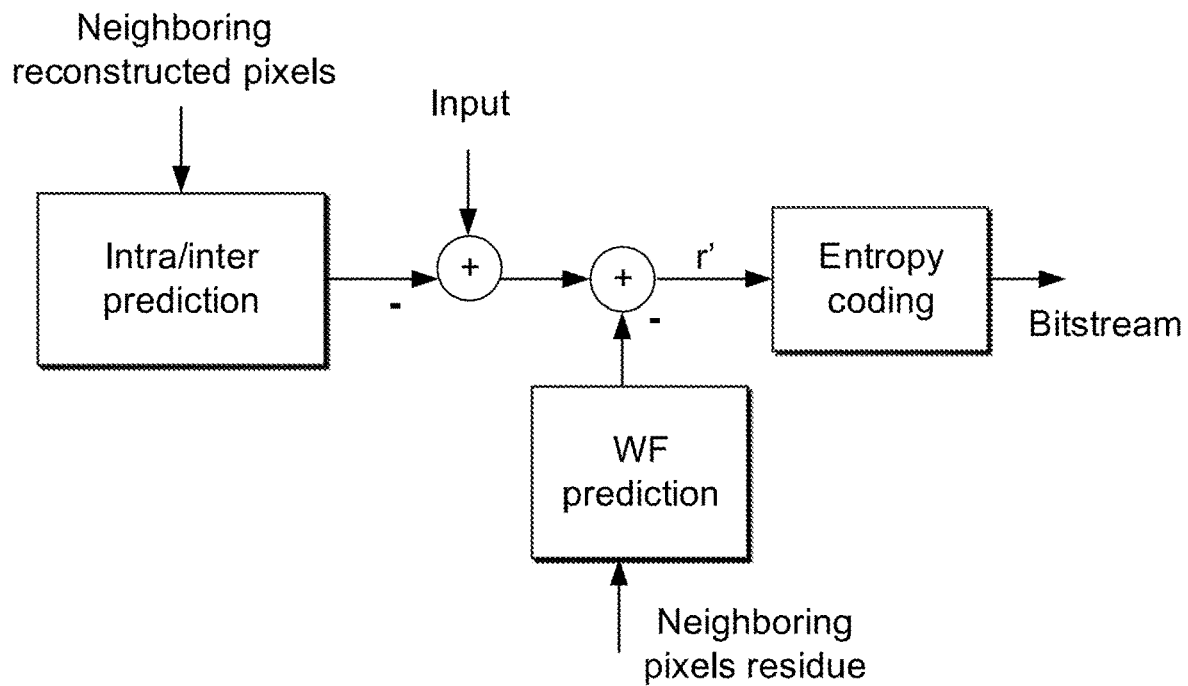
FIG. 27 is a functional block diagram illustrating an encoding process that uses Wiener filtering for predicting residuals.

In some embodiments, the residuals generated by existing intra or inter prediction modes are predicted further using the Wiener filter operating on neighboring reconstructed residuals. The difference between the actual residuals and the residuals predicted by the Wiener filter is coded and transmitted in the bitstream. A block diagram for an exemplary encoding process using this approach is provided in FIG. 27. For ease of explanation, the effects of transform and quantization are not explicitly described here. Embodiments that make use of Wiener filtering to predict residuals may be particularly beneficial in cases where the difference residuals r' have smaller values closer to zero, thereby resulting in fewer coding bits.

This mode is expected to perform well compared to Residual Differential Pulse Code Modulation (RDPCM), where only one neighboring residual is used as the residual prediction. Exemplary uses of Wiener filtering described herein operate on a group of neighboring residuals for prediction and can thereby better capture local residual statistics.

The Wiener filter coefficients may be estimated offline for different intra modes, TU sizes, and quantization parameters (QPs) and may be stored in a LUT. Based on this information the encoder or decoder may select the appropriate Wiener filter coefficients from the LUT. The Wiener filter coefficients may also be estimated online both at the encoder and decoder using neighboring reconstructed residuals. The encoder may indicate the use of Wiener filter residual prediction by signaling a flag in the bitstream.

Filter-Based Prediction Mode Using Residual Differential Pulse Code Modulation.

In filter based intra and inter encoding processes described herein, the residuals generated could be correlated and have large magnitude values that could result in higher bit consumption. To reduce this correlation and make the magnitude of the residuals smaller, some embodiments operate to apply Residual Differential Pulse Code Modulation (RDPCM) to the residuals. RDPCM is a lossless method and therefore leads to the original residuals being recovered after the inverse RDPCM process. The order in which the residuals are processed is the same as the scan order chosen for the TU.

Figure 28:
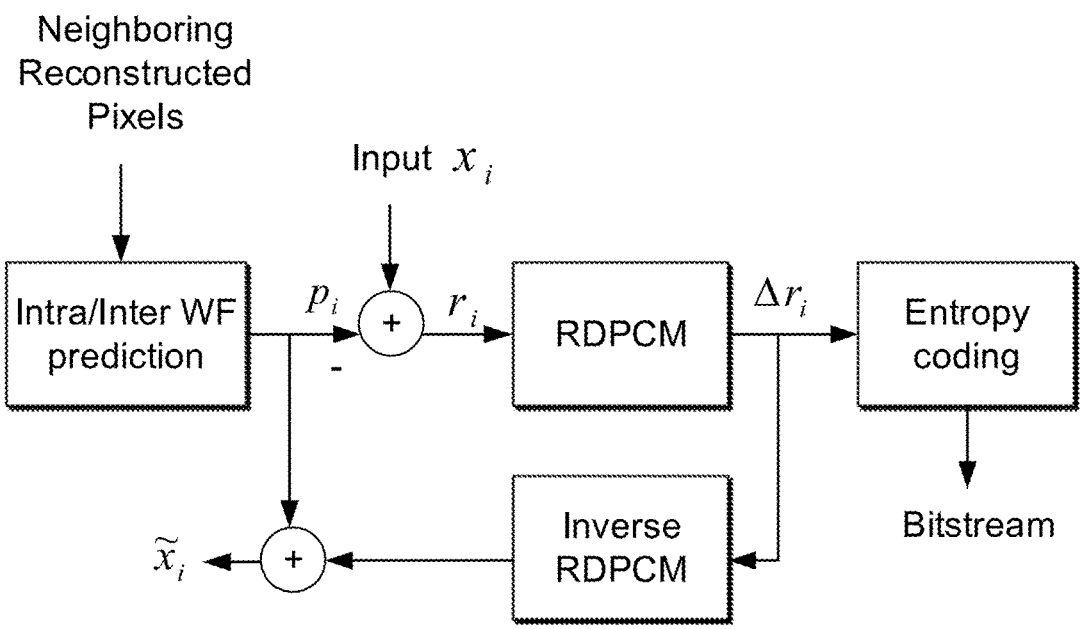
FIG. 28 is a functional block diagram illustrating an encoding process of the Wiener filter mode when using Residual Differential Pulse Code Modulation (RDPCM).

This approach is applicable to both pixel-based and block-based adaptive filter based prediction. An exemplary encoding process for filter based prediction mode using RDPCM is illustrated in FIG. 28. For ease of explanation, the effects of quantization and transform are not described herein. In the encoding process, either an inter or intra prediction block is obtained by Wiener filter prediction, and its associated residual block is generated. RDPCM processes the residual block on pixel-basis in the scan order chosen for prediction. A residual pixel is denoted herein by $r_i$. RDPCM computes the difference between previous residual $r_{i-1}$ and current residual $r_i$ to obtain differential residual $\Delta r_i$, which is then entropy coded. An exemplary encoder may also include an in-loop decoder, which derives the reconstructed pixel $\bar{x}_i$ from the differential residual using the reverse of the encoding process.

Bitstream Structure.

Figure 29:
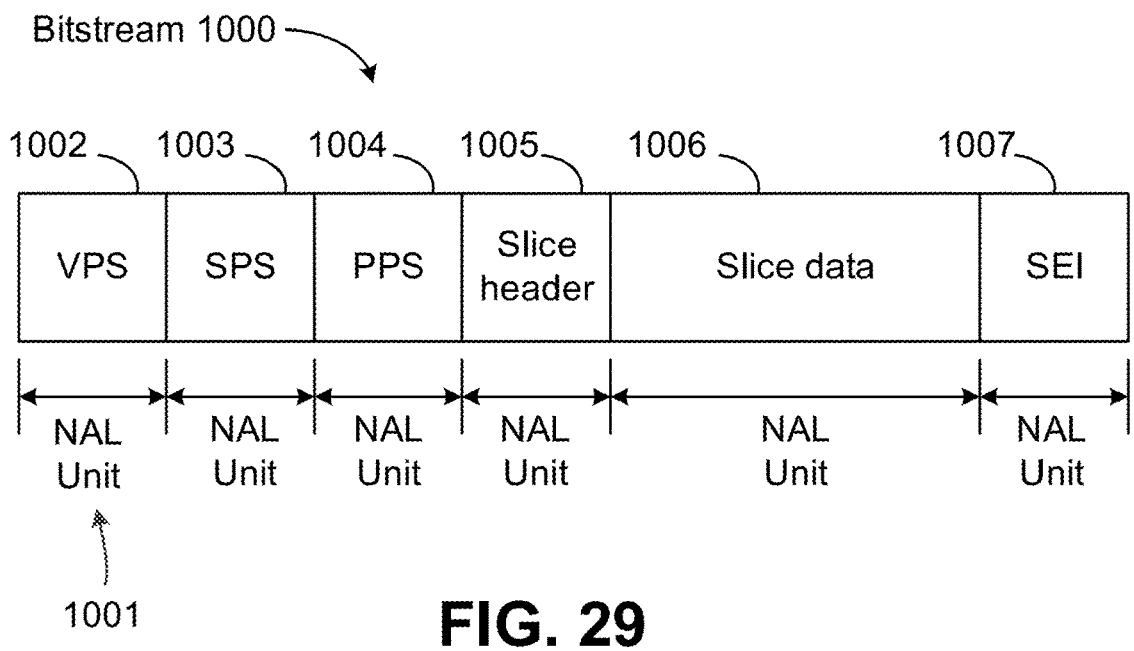
FIG. 29 is a diagram illustrating an example of a coded bitstream structure.

FIG. 29 is a diagram illustrating an example of a coded bitstream structure. A coded bitstream 1000 consists of a number of NAL (Network Abstraction layer) units 1001. A NAL unit may contain coded sample data such as coded slice 1006, or high level syntax metadata such as parameter set data, slice header data 1005 or supplemental enhancement information data 1007 (which may be referred to as an SEI message). Parameter sets are high level syntax structures containing essential syntax elements that may apply to multiple bitstream layers (e.g. video parameter set 1002 (VPS)), or may apply to a coded video sequence within one layer (e.g. sequence parameter set 1003 (SPS)), or may apply to a number of coded pictures within one coded video sequence (e.g. picture parameter set 1004 (PPS)). The parameter sets can be either sent together with the coded pictures of the video bit stream, or sent through other means (including out-of-band transmission using reliable channels, hard coding, etc.). Slice header 1005 is also a high level syntax structure that may contain some picture-related information that is relatively small or relevant only for certain slice or picture types. SEI messages 1007 carry the information that may not be needed by the decoding process but can be used for various other purposes such as picture output timing or display as well as loss detection and concealment.

Communications Infrastructure.

Figure 30:
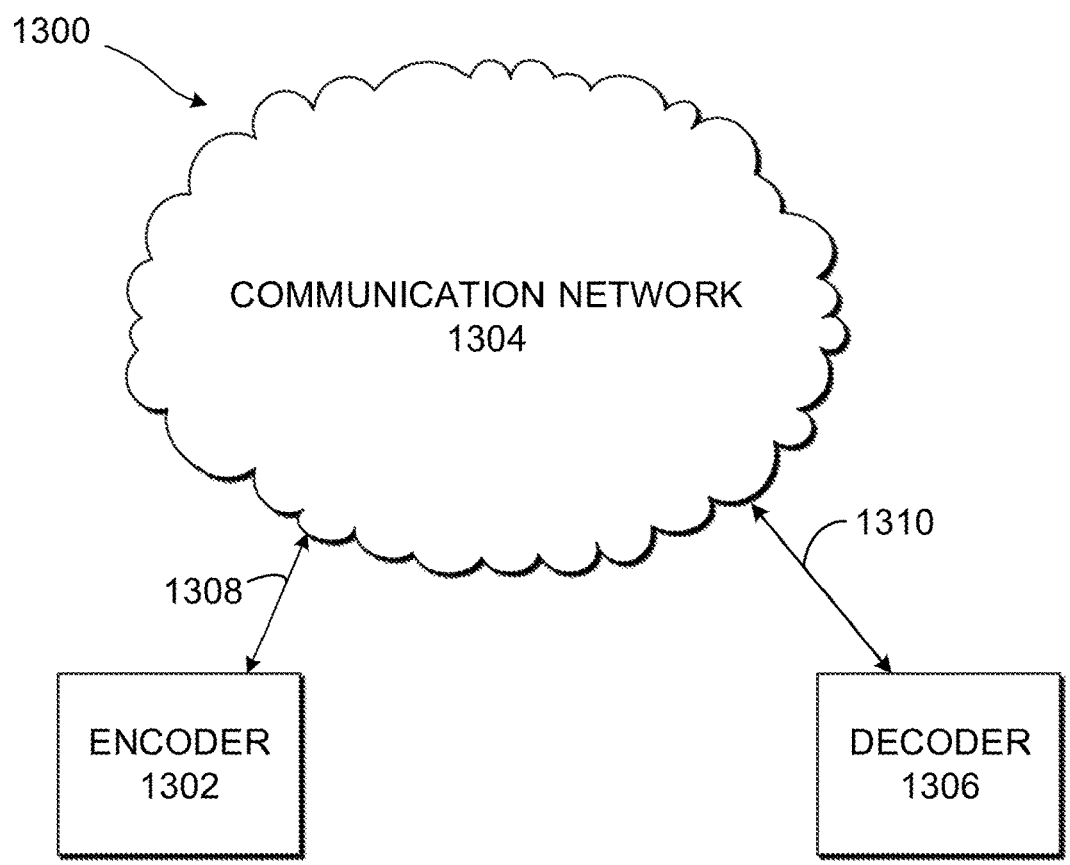
FIG. 30 is a diagram illustrating an example communication system.

FIG. 30 is a diagram illustrating an example of a communication system. The communication system 1300 may comprise an encoder 1302, a communication network 1304, and a decoder 1306. The encoder 1302 may be in communication with the network 1304 via a connection 1308, which may be a wireline connection or a wireless connection. The encoder 1302 may be similar to the block-based video encoder of FIG. 1. The encoder 1302 may include a single layer codec (e.g., FIG. 1) or a multilayer codec. For example, the encoder 1302 may be a multi-layer (e.g., two-layer) scalable coding system with picture-level ILP support. The decoder 1306 may be in communication with the network 1304 via a connection 1310, which may be a wireline connection or a wireless connection. The decoder 1306 may be similar to the block-based video decoder of FIG. 2. The decoder 1306 may include a single layer codec (e.g., FIG. 2) or a multilayer codec. For example, the decoder 1306 may be a multi-layer (e.g., two-layer) scalable decoding system with picture-level ILP support.

The encoder 1302 and/or the decoder 1306 may be incorporated into a wide variety of wired communication devices and/or wireless transmit/receive units (WTRUs), such as, but not limited to, digital televisions, wireless broadcast systems, a network element/terminal, servers, such as content or web servers (e.g., such as a Hypertext Transfer Protocol (HTTP) server), personal digital assistants (PDAs), laptop or desktop computers, tablet computers, digital cameras, digital recording devices, video gaming devices, video game consoles, cellular or satellite radio telephones, digital media players, and/or the like.

The communications network 1304 may be a suitable type of communication network. For example, the communications network 1304 may be a multiple access system that provides content, such as voice, data, video, messaging, broadcast, etc., to multiple wireless users. The communications network 1304 may enable multiple wireless users to access such content through the sharing of system resources, including wireless bandwidth. For example, the communications network 1304 may employ one or more channel access methods, such as code division multiple access (CDMA), time division multiple access (TDMA), frequency division multiple access (FDMA), orthogonal FDMA (OFDMA), single-carrier FDMA (SC-FDMA), and/or the like. The communication network 1304 may include multiple connected communication networks. The communication network 1304 may include the Internet and/or one or more private commercial networks such as cellular networks, WiFi hotspots, Internet Service Provider (ISP) networks, and/or the like.

Figure 31:
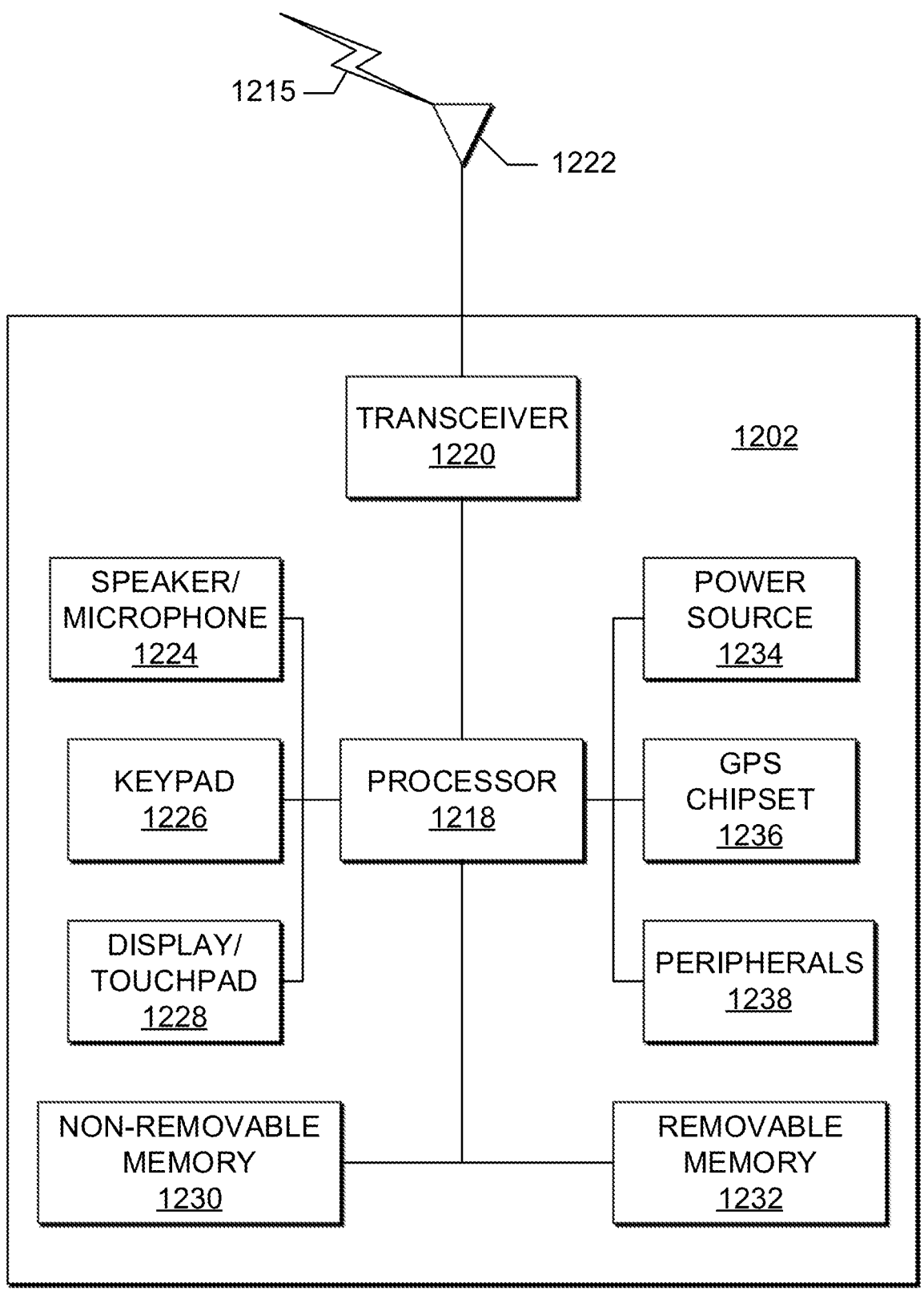
FIG. 31 is a diagram illustrating an example wireless transmit/receive unit (WTRU).

FIG. 31 is a system diagram of an example WTRU. As shown the example WTRU 1202 may include a processor 1218, a transceiver 1220, a transmit/receive element 1222, a speaker/microphone 1224, a keypad or keyboard 1226, a display/touchpad 1228, non-removable memory 1230, removable memory 1232, a power source 1234, a global positioning system (GPS) chipset 1236, and/or other peripherals 1238. It will be appreciated that the WTRU 1202 may include any sub-combination of the foregoing elements while remaining consistent with an embodiment. Further, a terminal in which an encoder (e.g., encoder 100) and/or a decoder (e.g., decoder 200) is incorporated may include some or all of the elements depicted in and described herein with reference to the WTRU 1202 of FIG. 31.

The processor 1218 may be a general purpose processor, a special purpose processor, a conventional processor, a digital signal processor (DSP), a graphics processing unit (GPU), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 1218 may perform signal coding, data processing, power control, input/output processing, and/or any other functionality that enables the WTRU 1500 to operate in a wired and/or wireless environment. The processor 1218 may be coupled to the transceiver 1220, which may be coupled to the transmit/receive element 1222. While FIG. 31 depicts the processor 1218 and the transceiver 1220 as separate components, it will be appreciated that the processor 1218 and the transceiver 1220 may be integrated together in an electronic package and/or chip.

The transmit/receive element 1222 may be configured to transmit signals to, and/or receive signals from, another terminal over an air interface 1215. For example, in one or more embodiments, the transmit/receive element 1222 may be an antenna configured to transmit and/or receive RF signals. In one or more embodiments, the transmit/receive element 1222 may be an emitter/detector configured to transmit and/or receive IR, UV, or visible light signals, for example. In one or more embodiments, the transmit/receive element 1222 may be configured to transmit and/or receive both RF and light signals. It will be appreciated that the transmit/receive element 1222 may be configured to transmit and/or receive any combination of wireless signals.

In addition, although the transmit/receive element 1222 is depicted in FIG. 31 as a single element, the WTRU 1202 may include any number of transmit/receive elements 1222. More specifically, the WTRU 1202 may employ MIMO technology. Thus, in one embodiment, the WTRU 1202 may include two or more transmit/receive elements 1222 (e.g., multiple antennas) for transmitting and receiving wireless signals over the air interface 1215.

The transceiver 1220 may be configured to modulate the signals that are to be transmitted by the transmit/receive element 1222 and/or to demodulate the signals that are received by the transmit/receive element 1222. As noted above, the WTRU 1202 may have multi-mode capabilities. Thus, the transceiver 1220 may include multiple transceivers for enabling the WTRU 1500 to communicate via multiple RATs, such as UTRA and IEEE 802.11, for example.

The processor 1218 of the WTRU 1202 may be coupled to, and may receive user input data from, the speaker/microphone 1224, the keypad 1226, and/or the display/touchpad 1228 (e.g., a liquid crystal display (LCD) display unit or organic light-emitting diode (OLED) display unit). The processor 1218 may also output user data to the speaker/microphone 1224, the keypad 1226, and/or the display/touchpad 1228. In addition, the processor 1218 may access information from, and store data in, any type of suitable memory, such as the non-removable memory 1230 and/or the removable memory 1232. The non-removable memory 1230 may include random-access memory (RAM), read-only memory (ROM), a hard disk, or any other type of memory storage device. The removable memory 1232 may include a subscriber identity module (SIM) card, a memory stick, a secure digital (SD) memory card, and the like. In one or more embodiments, the processor 1218 may access information from, and store data in, memory that is not physically located on the WTRU 1202, such as on a server or a home computer (not shown).

The processor 1218 may receive power from the power source 1234, and may be configured to distribute and/or control the power to the other components in the WTRU 1202. The power source 1234 may be any suitable device for powering the WTRU 1202. For example, the power source 1234 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 1218 may be coupled to the GPS chipset 1236, which may be configured to provide location information (e.g., longitude and latitude) regarding the current location of the WTRU 1202. In addition to, or in lieu of, the information from the GPS chipset 1236, the WTRU 1202 may receive location information over the air interface 1215 from a terminal (e.g., a base station) and/or determine its location based on the timing of the signals being received from two or more nearby base stations. It will be appreciated that the WTRU 1202 may acquire location information by way of any suitable location-determination method while remaining consistent with an embodiment.

The processor 1218 may further be coupled to other peripherals 1238, which may include one or more software and/or hardware modules that provide additional features, functionality and/or wired or wireless connectivity. For example, the peripherals 1238 may include an accelerometer, orientation sensors, motion sensors, a proximity sensor, an e-compass, a satellite transceiver, a digital camera and/or video recorder (e.g., for photographs and/or video), a universal serial bus (USB) port, a vibration device, a television transceiver, a hands free headset, a Bluetooth® module, a frequency modulated (FM) radio unit, and software modules such as a digital music player, a media player, a video game player module, an Internet browser, and the like.

By way of example, the WTRU 1202 may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a tablet computer, a personal computer, a wireless sensor, consumer electronics, or any other terminal capable of receiving and processing compressed video communications.

The WTRU 1202 and/or a communication network (e.g., communication network 804) may implement a radio technology such as Universal Mobile Telecommunications System (UMTS) Terrestrial Radio Access (UTRA), which may establish the air interface 1215 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA). The WTRU 1202 and/or a communication network (e.g., communication network 804) may implement a radio technology such as Evolved UMTS Terrestrial Radio Access (E-UTRA), which may establish the air interface 1515 using Long Term Evolution (LTE) and/or LTE-Advanced (LTE-A).

The WTRU 1202 and/or a communication network (e.g., communication network 804) may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like. The WTRU 1500 and/or a communication network (e.g., communication network 804) may implement a radio technology such as IEEE 802.11, IEEE 802.15, or the like.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

The invention claimed is:

1. A method comprising:
   generating an intra prediction for each pixel in a current block of pixels;
   determining coefficients of a filter associated with the current block of pixels;
   applying the filter to a plurality of pixels, including at least one of the intra-predicted pixels in the current block, to yield a filter-based prediction for at least one of the pixels in the current block; and
   reconstructing the pixels in the current block by adding a prediction residual to the filter-based prediction of at least one of the pixels in the current block.

2. The method of claim 1, wherein the filter is a Wiener filter.

3. The method of claim 1, wherein applying of the filter is performed only if a flag is signaled in a bitstream for the current block indicating that filter-based prediction is enabled.

4. The method of claim 1, wherein determining coefficients of the filter comprises deriving the coefficients from neighboring reconstructed pixels.

5. The method of claim 1, wherein determining coefficients of the filter comprises selecting filter coefficients to substantially minimize a mean square error between (i) reconstructed pixels in a template region neighboring the current block and (ii) a filtered version of an intra prediction of the pixels in the template region.

6. The method of claim 1, wherein the coefficients are signaled explicitly in a bitstream.

7. The method of claim 1, wherein determining the coefficients comprises selecting the coefficients from a lookup table.

8. The method of claim 7, wherein the coefficients are selected from the lookup table based on a block size and on the intra prediction mode used to generate the intra prediction.

9. The method of claim 1, further comprising performing in-loop filtering on the reconstructed pixels.

10. An apparatus comprising:
    a processor configured to perform at least:
    generating an intra or inter prediction for each pixel in a current block of pixels;
    determining coefficients of a filter associated with the current block of pixels;
    applying the filter to a plurality of pixels, including at least one of the intra-predicted or inter-predicted pixels in the current block, to yield a filter-based prediction for at least one of the pixels in the current block; and
    reconstructing the pixels in the current block by adding a prediction residual to the filter-based prediction of at least one of the pixels in the current block.

11. The apparatus of claim 10, wherein the processor is further configured to perform in-loop filtering on the reconstructed pixels.

12. The apparatus of claim 10, wherein generating an intra or inter prediction comprises generating an inter prediction.

13. A method comprising:
    generating a motion-compensated prediction for each pixel in a current block of pixels;
    determining coefficients of a filter associated with the current block of pixels;
    applying the filter to a plurality of pixels, including at least one of the motion-compensated predicted pixels in the current block to yield a filter-based prediction for at least one of the pixels in the current block; and reconstructing the pixels in the current block by adding a prediction residual to the filter-based prediction of at least one of the pixels in the current block.

14. The method of claim 13, wherein the filter is a Wiener filter.

15. The method of claim 13, wherein determining coefficients of the filter comprises deriving the coefficients from neighboring reconstructed pixels.

16. The method of claim 13, wherein determining coefficients of the filter comprises selecting filter coefficients to substantially minimize a mean square error between (i) reconstructed pixels in a template region neighboring the current block and (ii) a filtered version of a motion-compensated prediction of the pixels in the template region.

17. The method of claim 13, wherein the coefficients are signaled explicitly in a bitstream.

18. The method of claim 13, wherein determining the coefficients comprises selecting the coefficients from a lookup table.

19. The method of claim 13, wherein the coefficients are selected from the lookup table based on a block size and on an edge direction of the motion-compensated prediction.

20. The method of claim 13, further comprising performing in-loop filtering on the reconstructed pixels.

* * * * *